US009229556B2

United States Patent
Yoon et al.

(10) Patent No.: US 9,229,556 B2
(45) Date of Patent: Jan. 5, 2016

(54) APPARATUS AND METHOD FOR SENSING 3D OBJECT

(71) Applicant: Samsung Electronics Co. Ltd., Suwon-si, Gyeonggi-do (KR)

(72) Inventors: Je-Han Yoon, Seongnam-si (KR); Hyung-Jin Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 13/860,807

(22) Filed: Apr. 11, 2013

(65) Prior Publication Data

US 2013/0271407 A1  Oct. 17, 2013

(30) Foreign Application Priority Data

Apr. 12, 2012  (KR) .................. 10-2012-0038011
Jan. 23, 2013  (KR) .................. 10-2013-0007566

(51) Int. Cl.
  *G06F 3/041* (2006.01)
  *G06F 3/0488* (2013.01)

(52) U.S. Cl.
  CPC .............. *G06F 3/041* (2013.01); *G06F 3/0488* (2013.01)

(58) Field of Classification Search
  CPC ................ G06F 3/0346; G06F 2203/04802; G06F 2203/04101; G06F 2203/04108
  USPC .......................................... 345/173
  See application file for complete search history.

(56) References Cited

U.S. PATENT DOCUMENTS

| 2006/0161871 | A1 | 7/2006 | Hotelling et al. | |
| 2009/0265670 | A1 | 10/2009 | Kim et al. | |
| 2011/0018811 | A1 | 1/2011 | Miernik | |
| 2011/0093778 | A1 | 4/2011 | Kim et al. | |
| 2012/0113018 | A1* | 5/2012 | Yan | 345/173 |
| 2012/0127102 | A1* | 5/2012 | Uenohara et al. | 345/173 |
| 2012/0262398 | A1* | 10/2012 | Kim et al. | 345/173 |
| 2012/0274581 | A1* | 11/2012 | Kim | 345/173 |

FOREIGN PATENT DOCUMENTS

| KR | 1020110026960 A | 3/2011 |
| KR | 1020110054256 A | 5/2011 |

* cited by examiner

*Primary Examiner* — Long D Pham
(74) *Attorney, Agent, or Firm* — Jefferson IP Law, LLP

(57) ABSTRACT

Provided is an apparatus and method for sensing a three-dimensional (3D) object. The apparatus includes a display unit including a first sensing space in which a sensitivity with respect to a proximity touch is higher than a threshold value and a second sensing space in which a sensitivity with respect to the proximity touch is lower than the threshold value, on a stereoscopic space on which at least one 3D object is disposed and a controller for moving predetermined 3D objects in a predetermined direction if a proximity touch is generated on the second sensing space, detecting coordinates of a 3D object corresponding to a proximity touch generated on the first sensing space if the proximity touch generated on the second sensing space is moved and generated on the first sensing space, and performing a function corresponding to the 3D object.

32 Claims, 16 Drawing Sheets

APPARATUS AND METHOD FOR SENSING 3D OBJECT

PRIORITY

This application claims the benefit under 35 U.S.C. §119(a) of a Korean patent application filed in the Korean Intellectual Property Office on Apr. 12, 2012 and assigned Serial No. 10-2012-0038011 and a Korean patent application filed in the Korean Intellectual Property Office on Jan. 23, 2013 and assigned Serial No. 10-2013-0007566, the entire disclosures of each of which are hereby incorporated by reference.

BACKGROUND OF THE INVENTION

1. Field of the Invention

The present invention generally relates to an apparatus and method for sensing a three-dimensional (3D) object, and more particularly, to an apparatus and method for sensing a 3D object, in which accurate sensing of a 3D object displayed as a stereoscopic User Interface (UI) on a stereoscopic space can be provided.

2. Description of the Related Art

With the development of three-dimensional (3D) displays for portable terminals, a user interface is stereoscopically displayed as a 3D object on a virtual stereoscopic space. Techniques for displaying interaction with a 3D object on a virtual stereoscopic space include a first scheme using a touch sensor and a second scheme using proximity touch or input on a space.

The first scheme using a touch sensor stereoscopically displays a User Interface (UI) and uses a touch-based two-dimensional (2D) coordinate input scheme. The second scheme using proximity touch/input on a space may obtain 3D space coordinates. In the second scheme using proximity touch/input on a space, input coordinates on the space are connected with space coordinates of a 3D object for interaction with the 3D object on the 3D space.

When the touch sensor is used, in interaction with a 3D object shown in front of a front surface of a display unit, an input object such as a hand, etc., has to pass through the 3D object, causing visual discomfort. To prevent such a phenomenon, the 3D object is displayed on a rear surface of the display unit. In this case, a stereoscopic effect is degraded and 3D object configuration may be subject to some restrictions.

FIG. 1 is a diagram for describing a state in which a 3D object displayed on a virtual stereoscopic space is displayed in an overlapping manner with an object such as a hand, etc. according to the related art.

Referring to FIG. 1, a 3D object displayed on a virtual stereoscopic space is displayed with overlapping an object such as a hand, etc. A 3D object displayed as a stereoscopic UI is displayed on a virtual space A on the front surface of the display unit and a virtual space B on the rear surface of the display unit. When a user touches the display unit to select a corresponding 3D object, the user's hand passes through the 3D object such that the 3D object and the user's hand are displayed in an overlapping manner.

When the proximity touch/input on a space is used, 3D space coordinates are detected for interaction with the 3D object, such that the foregoing problem does not occur, but due to limitations in a detecting method and technique, sensing resolution decreases as a distance between the display unit and the user increases. For example, at a height of 1 cm from the front surface of the display unit, 5×3 icons may be distinguished and selected at an accuracy of 99%; at a height of 3 cm, the accuracy decreases to 80%, such that to maintain the same accuracy of 99%, only 3×2 icons can be displayed.

FIGS. 2A and 2B are diagrams for describing an error range according to a distance between a proximity sensor and a hand according to the related art.

Referring to FIG. 2A, for a short distance between the display unit and the user, a region which can be accurately identified and detected is small, such that many 3D objects may be displayed. In FIG. 2B, for a long distance between the display unit and the user, a region which can be accurately identified and detected is large, such that fewer 3D objects may be displayed as compared to FIG. 2A.

FIGS. 3A and 3B are diagrams for describing sensing accuracy with respect to a distance between a proximity sensor and a hand.

FIG. 3A shows the number of 3D objects which can be displayed according to a distance Z between the display unit and the user, and FIG. 3B shows sensing accuracy according to the distance Z between the display unit and the user.

SUMMARY OF THE INVENTION

Aspects of the present invention are to address at least the above-mentioned problems and/or disadvantages and to provide at least the advantages described below. Accordingly, an aspect of the present invention is to provide an apparatus and method for detecting a 3D object, in which the accuracy of sensitivity with respect to the 3D object displayed as a stereoscopic UI on a virtual stereoscopic space may be provided.

An aspect of the present invention is to provide an apparatus and method for sensing a 3D object, in which a 3D object displayed as a stereoscopic UI on a stereoscopic space is not displayed in an overlapping manner with an object such as a user's hand or a pen which generates a proximity touch.

Another aspect of the present invention is to provide an apparatus and method for sensing a 3D object, in which a proximity touch generated in a space having a low sensitivity with respect to the 3D object (or a low-sensitivity space) on the stereoscopic space is guided to move to a space having a high sensitivity with respect to the 3D object (or a high-sensitivity space).

According to an aspect of the present invention, an apparatus for detecting a 3D object is provided. The apparatus includes a display unit including a first sensing space in which a sensitivity with respect to a proximity touch is higher than a threshold value and a second sensing space in which a sensitivity with respect to the proximity touch is lower than the threshold value, on a stereoscopic space on which at least one 3D object is disposed, and a controller for moving predetermined 3D objects in a predetermined direction if a proximity touch is generated on the second sensing space, for detecting coordinates of a 3D object corresponding to a proximity touch generated on the first sensing space if the proximity touch generated on the second sensing space is moved and generated on the first sensing space, and for performing a function corresponding to the 3D object.

According to another aspect of the present invention, a method for sensing a three-dimensional (3D) object is provided. The method includes moving predetermined 3D objects in a predetermined direction, if a proximity touch is generated on a second sensing space in which a sensitivity with respect to a proximity touch is lower than a threshold value, on a stereoscopic space on which at least one 3D object is disposed, detecting coordinates of a 3D object corresponding to a proximity touch generated on a first sensing space in which a sensitivity with respect to the proximity touch is higher than the threshold value, if the proximity touch generated on the second sensing space is moved and generated on the first sensing space, and performing a function corresponding to the 3D object.

BRIEF DESCRIPTION OF THE DRAWINGS

The above and other features and advantages of an exemplary embodiment of the present invention will be more apparent from the following detailed description taken in conjunction with the accompanying drawings, in which.

Throughout the drawings, it should be noted that like reference numbers are used to depict the same or similar elements, features, and structures.

DETAILED DESCRIPTION OF THE EXEMPLARY EMBODIMENT

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A terminal according to an exemplary embodiment of the present invention may include a portable terminal and a stationary terminal. The portable terminal may be a mobile electronic device which can be easily carried, such as a video phone, a cellular phone, a smart phone, an International Mobile Telecommunication (IMT)-2000 terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an Electronic (E) book, a portable computer (e.g., a notebook, a tablet, etc.), a digital camera, or the like. The stationary terminal may be a desktop Personal Computer (PC).

In an embodiment of the present invention, a proximity touch means an action which allows positioning on a display unit to be recognized due to approach to the display unit without generation of a direct touch on the display unit, and a contact touch means an action of an actual touch on the display unit.

Figure 1:
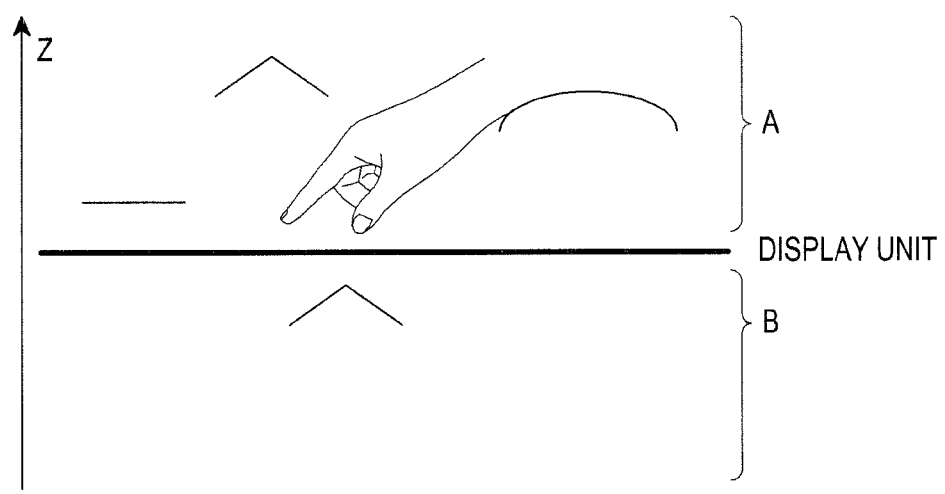
FIG. 1 is a diagram for describing a state in which a 3D object displayed on a virtual stereoscopic space is displayed in an overlapping manner with an object such as a hand, etc.
Figure 2A:
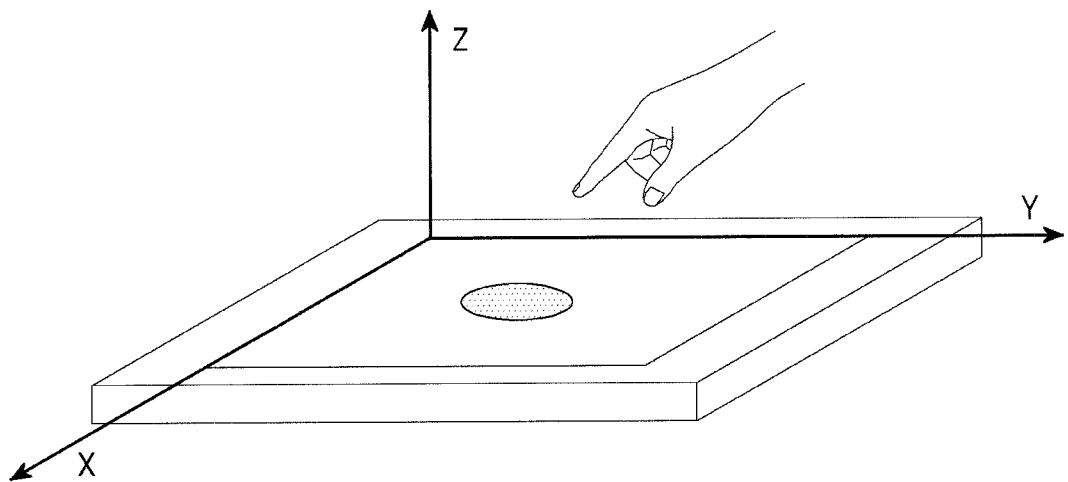
FIGS. 2A and 2B are diagrams for describing an error range sensible according to a distance between a proximity sensor and a hand.
Figure 2B:
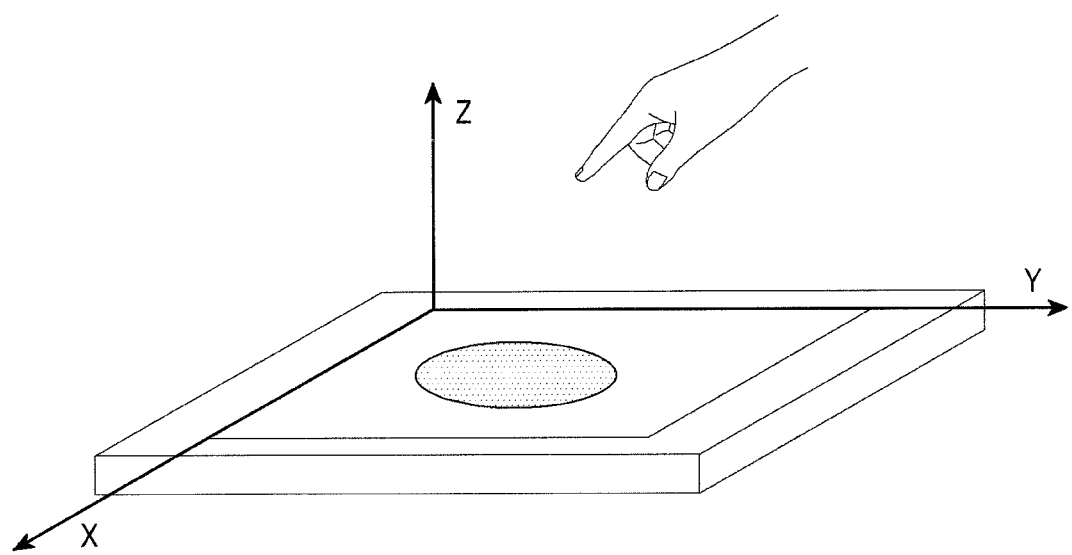
Figure 3A:
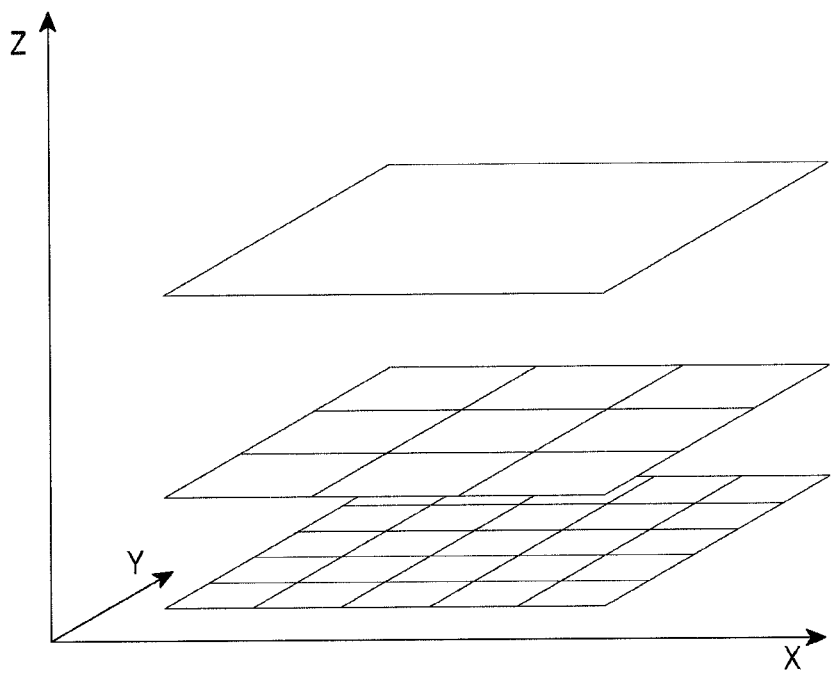
FIGS. 3A and 3B are diagrams for describing sensing accuracy with respect to a distance between a proximity sensor and a hand.
Figure 3B:
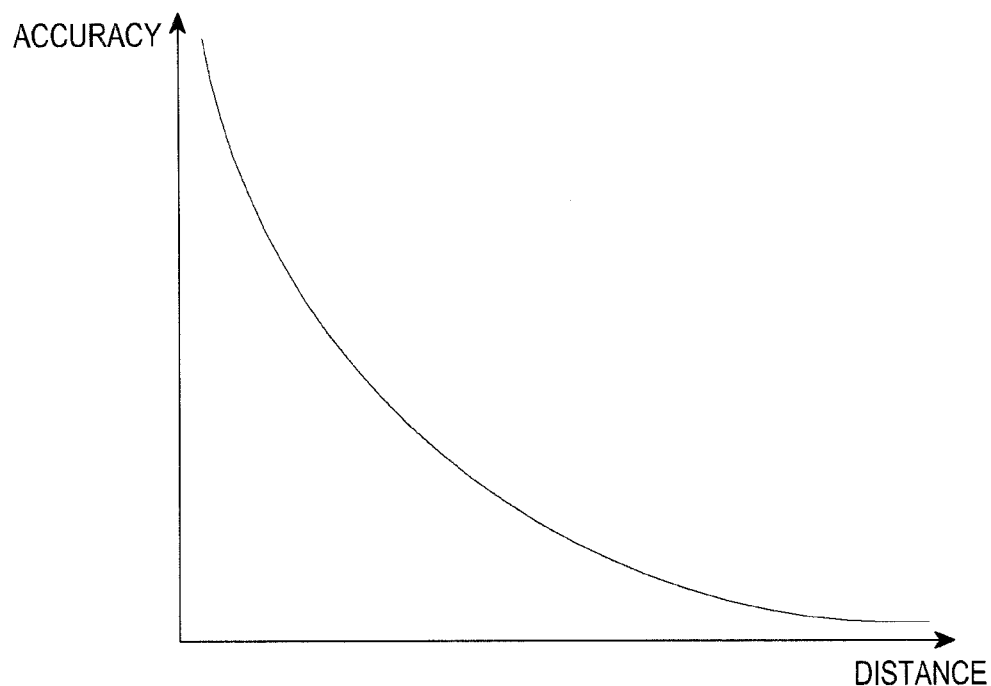
Figure 4:
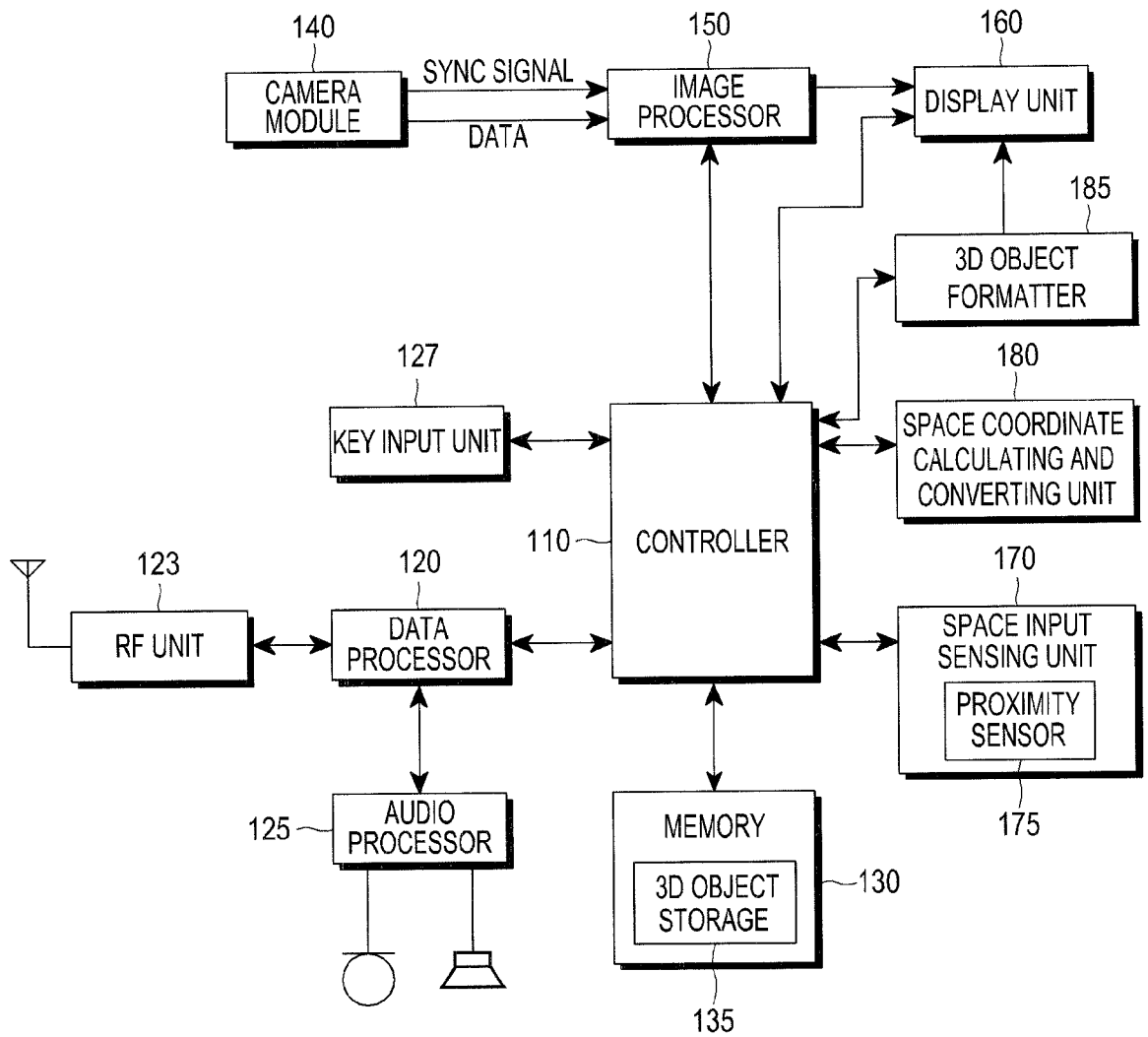
FIG. 4 is a block diagram of a terminal according to an exemplary embodiment of the present invention.

FIG. 4 is a block diagram of a terminal according to an exemplary embodiment of the present invention.

Referring to FIG. 4, a Radio Frequency (RF) unit 123 performs a radio communication function of the terminal The RF unit 123 includes an RF transmitter for up-converting a frequency of a transmission signal and amplifying the transmitted signal and an RF receiver for low-noise amplifying a received signal and down-converting the frequency of the received signal. A data processor 120 includes a transmitter for encoding and modulating the transmission signal and a receiver for demodulating and decoding the received signal. That is, the data processor 120 may include a modem and a codec. Herein, the codec includes a data codec for processing packet data and an audio codec for processing an audio signal such as voice. An audio processor 125 reproduces a received audio signal being output from the audio codec of the data processor 120 or transmits a transmission audio signal generated from a microphone to the audio codec of the data processor 120.

A key input unit 127 includes keys for inputting numeric and character information and functional keys for setting various functions.

A memory 130 includes program and data memories. The program memory stores programs for controlling a general operation of the terminal. According to an embodiment of the present invention, the memory 130 may store programs for controlling a 3D object to be detected when a proximity touch generated on a second sensing space of a virtual stereoscopic space which displays at least one 3D object region moves and then is generated on a first sensing space or is generated as a contact touch on the display unit 160, and programs for controlling the 3D object to be moved and displayed according to moving speed and direction of the proximity touch generated on the second sensing space. The data memory temporarily stores data generated during execution of the programs.

According to an embodiment of the present invention, the memory 130 includes a 3D object storing unit 135 for storing at least one 3D object which have different 3D depths and can be displayed as a stereoscopic User Interface (UI) on a virtual stereoscopic space.

The 3D object stored in the 3D object storing unit 135 is object data which includes position, shape, and size on a 3D coordinate system for interaction with a user, including reactions and actions with respect to various actions such as user's execution, move, drag, drop, and so forth.

The controller 110 functions to control the overall operation of the terminal.

According to an embodiment of the present invention, the controller 110 moves predetermined 3D objects in a predetermined direction when the proximity touch occurs on the second sensing space, detects coordinates of a 3D object corresponding to the proximity touch generated on the first sensing space when the proximity touch generated on the second sensing space is moved and is generated on the first sensing space of the display unit 160, and executes a function corresponding to the 3D object.

According to an exemplary embodiment of the present invention, the virtual stereoscopic space for displaying at least one 3D object includes a front virtual space corresponding to a Z-axis direction of the display unit 160 and a rear virtual space corresponding to a −Z-axis direction of the display unit 160.

The front virtual space of the display unit 160 includes the first sensing space which includes a predetermined space in the Z-axis direction from the display unit 160 on which at least one proximity sensors are disposed, and the second sensing space which includes a predetermined space in the Z-axis direction from a maximum Z value of the first sensing space.

The first sensing space is a high-sensitivity space in which sensitivity with respect to a proximity touch is greater than a threshold value, and the second sensing space is a low-sensitivity space in which sensitivity with respect to a proximity touch is less than the threshold. The first sensing space and the second sensing space may be set according to types and characteristics of the proximity sensor units.

Therefore, the controller 110 senses only the proximity touch generated on the first sensing space, thereby accurately detecting the 3D object selected by the user.

According to an embodiment of the present invention, the controller 110 disposes at least one 3D object having different 3D depths on the front virtual space of the display unit 160, which includes the first sensing space and the second sensing space, and the rear virtual space of the display unit 160, respectively, on the virtual stereoscopic space, and displays them thereon, respectively.

According to a first exemplary embodiment of the present invention, when the proximity touch is generated on the second sensing space during display of the at least one 3D object with different depths on the stereoscopic space, the controller 110 moves and displays the at least one 3D object disposed on the stereoscopic space in a moving direction in which the proximity touch is generated. When the proximity touch generated on the second sensing space is moved and generated on the first sensing space, the controller 110 stops moving the at least one 3D object and detects coordinates of one 3D object corresponding to the proximity touch among the at least one 3D object.

In this case, when the proximity touch is generated on the second sensing space, the controller 110 detects a Z value among X, Y, and Z coordinates of the proximity touch to detect a moving direction of the proximity touch. When the proximity touch is generated on the first sensing space, the controller 110 detects X, Y, and Z coordinates of the proximity touch to detect coordinates of the 3D object corresponding to the proximity touch.

To allow a user's hand or pen which generates the proximity touch on the first sensing space to meet the 3D object corresponding to the proximity touch among the at least one 3D object, according to an exemplary embodiment of the present invention, the controller 110 adjusts a movement amount of the at least one 3D object which move on the second sensing space, by using Equation 1, which is described below with reference to FIGS. 11A and 11B.

According to a second exemplary embodiment of the present invention, when the proximity touch is generated on the second sensing space, the controller 110 selects candidate 3D objects from among the at least one 3D object disposed on the stereoscopic space and moves and displays all of the 3D objects in a moving direction in which the proximity touch is generated.

The controller 110 may select, as the candidate 3D objects, 3D objects which exist within a predetermined range around X, Y, and Z coordinates of a position in which the proximity touch is generated, or all 3D objects having a smaller value than a Z value of the X, Y, and Z coordinates of the generation position of the proximity touch.

In the second exemplary embodiment of the present invention, a description will be made by using an example in which the 3D objects which exist in the predetermined range around the X, Y, and Z coordinates of the generation position of the proximity touch are selected as the candidate 3D objects.

As the proximity touch generated on the second sensing space is moved and approaches the first sensing space, the accuracy of coordinates of the proximity touch increases. Therefore, as a distance between the position in which the proximity touch is generated and the first sensing space decreases, the controller 110 narrows the predetermined range for detecting the candidate 3D objects, thus reducing the number of 3D candidate objects.

In order to allow the user's hand or pen which generates the proximity touch on the first sensing space to meet one 3D object corresponding to the proximity touch among the candidate 3D objects, the controller 110 adjusts a movement amount of the candidate 3D object by using Equation 1.

According to a third embodiment of the present invention, when a proximity touch is generated on the second sensing space, the controller 110 selects candidate 3D objects from among the at least one 3D object disposed on the stereoscopic space.

The controller 110 may select, as the candidate 3D objects, 3D objects which exist in a predetermined range around X, Y, and Z coordinates of a position in which the proximity touch is generated, or all 3D objects having a smaller value than a Z value of the X, Y, and Z coordinates of the generation position of the proximity touch.

In the third exemplary embodiment of the present invention, a description will be made by using an example in which the 3D objects which exist in the predetermined range around the X, Y, and Z coordinates of the generation position of the proximity touch are selected as the candidate 3D objects.

When a 3D object disposed on a rear stereoscopic space of the display unit exists among the selected candidate 3D objects, the controller 110 moves and displays the candidate 3D object in an opposite direction to the moving direction in which the proximity touch is generated.

When the candidate 3D object is moved and displayed in the opposite direction to the moving direction in which the proximity touch is generated, as the proximity touch generated on the second sensing space is moved and approaches the first sensing space, the accuracy of coordinates of the generation position of the proximity touch is improved. As the proximity touch generated on the second sensing space is moved and approaches the first sensing space, the controller 110 narrows the predetermined range for detecting the candidate 3D objects, thereby reducing the number of candidate 3D objects. When moving and displaying the candidate 3D object in the opposite direction to the moving direction in which the proximity touch is generated, the controller 110 may increase a transparency for a 3D object having a large value than a Z value of the X, Y, and Z coordinates of the proximity touch among the initially selected candidate 3D objects or may not display the 3D object, thereby preventing the 3D object from overlapping with the user's hand or pen which generates the proximity touch.

To allow the user's hand or pen which generates the proximity touch on the first sensing space to meet one 3D object corresponding to the proximity touch among the candidate 3D objects, the controller 110 adjusts a movement amount of the candidate 3D object by using Equation 1.

According to a fourth exemplary embodiment of the present invention, when a proximity touch is generated on a front stereoscopic space of the display unit, the controller 110 moves and displays the at least one 3D object disposed on the stereoscopic space in a moving direction in which the proximity touch is generated. When the proximity touch generated on the second sensing space is moved and generated as a contact touch on the display unit 160, the controller 110 stops moving the at least one 3D object and detects coordinates of one 3D object corresponding to the contact touch among the at least one 3D object.

When the proximity touch is generated on the front stereoscopic space of the display unit 160, the controller 110 detects a Z value of the X, Y, and Z coordinates of the proximity touch to detect the moving direction of the proximity touch. When the contact touch is generated on the display unit 160, the controller 110 detects the X, Y, and Z coordinates of the contact touch to detect coordinates of the 3D object corresponding to the contact touch. A space input sensing unit 170 may be any device capable of receiving a user's input as 3D space coordinates from a short range of several centimeters to a long range of several meters.

An active device may be a device for recognizing distance and position with respect to a hand (or a similar object such as a pen, etc.) using an emitter and a receiver of a complex medium such as an infrared or ultrasonic wave, an electric field, a magnetic field, etc. A passive device may be a device for recognizing distance and position with respect to a hand through image processing using a camera module 140 and detection of a change in the magnetic field/electric field.

The space input sensing unit 170 may also be realized with a combination of sensors capable of measuring only a distance between the display unit 160 on which the contact touch is generated and the Z axis of the display unit 160.

An exemplary embodiment of the present invention will be described using an example in which as the space input sensing unit 170, at least one proximity sensors 175 are disposed inside the display unit 160 or in proximity to the display unit 160.

The proximity sensor 175 refers to a proximity sensor which detects an object approaching a predetermined detection surface or the presence or absence of a nearby object without a mechanical touch by using a force of an electromagnetic field or an infrared ray. The proximity sensor 175 may include a transmissive type photoelectric sensor, a direct-reflective type photoelectric sensor, a mirror-reflective type photoelectric sensor, a high-frequency oscillation-type proximity sensor, a capacitive-type proximity sensor, a magnetic-type proximity sensor, an infrared proximity sensor, etc.

According to an exemplary embodiment of the present invention, the space input sensing unit 170 extracts space coordinates corresponding to the proximity touch generated on the virtual stereoscopic space including the first sensing space and the second sensing space and transmits the extracted space coordinates to the controller 110, thus determining the sensing space on which the proximity touch is generated.

A space coordinates calculating and converting unit 180 unifies space coordinates of a 3D object and coordinates extracted by the space input sensing unit 170. The space coordinates of the 3D object and the coordinates extracted by the space input sensing unit 170 may have different units, and may vary according to the size of the display unit 160 and a distance between the display unit 160 and the user. Despite being the same 3D object, its actually displayed size may change with the size of the display unit 160, such that space coordinates not only are converted in terms of the unit, but also are calculated and unified by reflecting environmental conditions.

A 3D object formatter 185 adjusts a 3D object image suitably for a device of the display unit 160 to display a 3D object on the display unit 160.

The display unit 160 displays an image signal output from the image processor 150 on the screen and displays user data output from the controller 110. Herein, the display unit 160 may be a Liquid Crystal Display (LCD), and in this case, the display unit 160 may include an LCD controller, a memory capable of storing image data, an LCD element, and so on. When the LCD is implemented with a touch screen, it may also serve as an input unit, and in this case, keys such as the key input unit 127 may be displayed on the display unit 160.

According to an exemplary embodiment of the present invention, the display unit 160 is a 3D display unit capable of displaying 3D graphics and a 3D object image, and may be a parallax barrier type, a lenticular lens type, a hologram type, or the like as a no-eyeglass system, or a time-division type, a polarization type, or the like as an eyeglass system.

The camera module 140 captures an image, and may include a camera sensor for converting an optical signal of the captured image into an electrical signal, and a signal processor for converting an analog image signal of the image captured by the camera sensor into digital data. Herein, it is assumed that the camera sensor is a Charge Coupled Device (CCD) sensor or a Complementary Metal Oxide Semiconductor (CMOS) sensor, and the signal processor may be implemented as a Digital Signal Processor (DSP). In addition, the camera sensor and the signal processor may be implemented as one piece or separately.

The image processor 150 performs Image Signal Processing (ISP) to display an image signal output from the camera module 140 on a display unit 160. The ISP executes functions such as gamma correction, interpolation, color space conversion, image effect, image scale, Auto White Balance (AWB), Auto Exposure (AE) and Auto Focus (AF). Thus, the image processor 150 processes the image signal output from the camera module 140 in the unit of a frame, and outputs frame image data adaptively to the features and size of the display unit 160. The image processor 150 includes an image codec, and compresses the frame image data displayed on the display unit 160 in a preset manner or restores the compressed frame image data to the original frame image data. Herein, the image codec may be Joint Picture Experts Group (JPEG) codec, Moving Picture Experts Group 4 (MPEG4) codec, or Wavelet codec. It is assumed that the image processor 150 has an on screen display (OSD) function. The image processor 150 may output OSD data according to the displayed picture size under the control of the controller 110.

A 3D object sensing operation in the above-described terminal will be described in more detail with reference to FIGS. 5 through 12.

Figure 5:
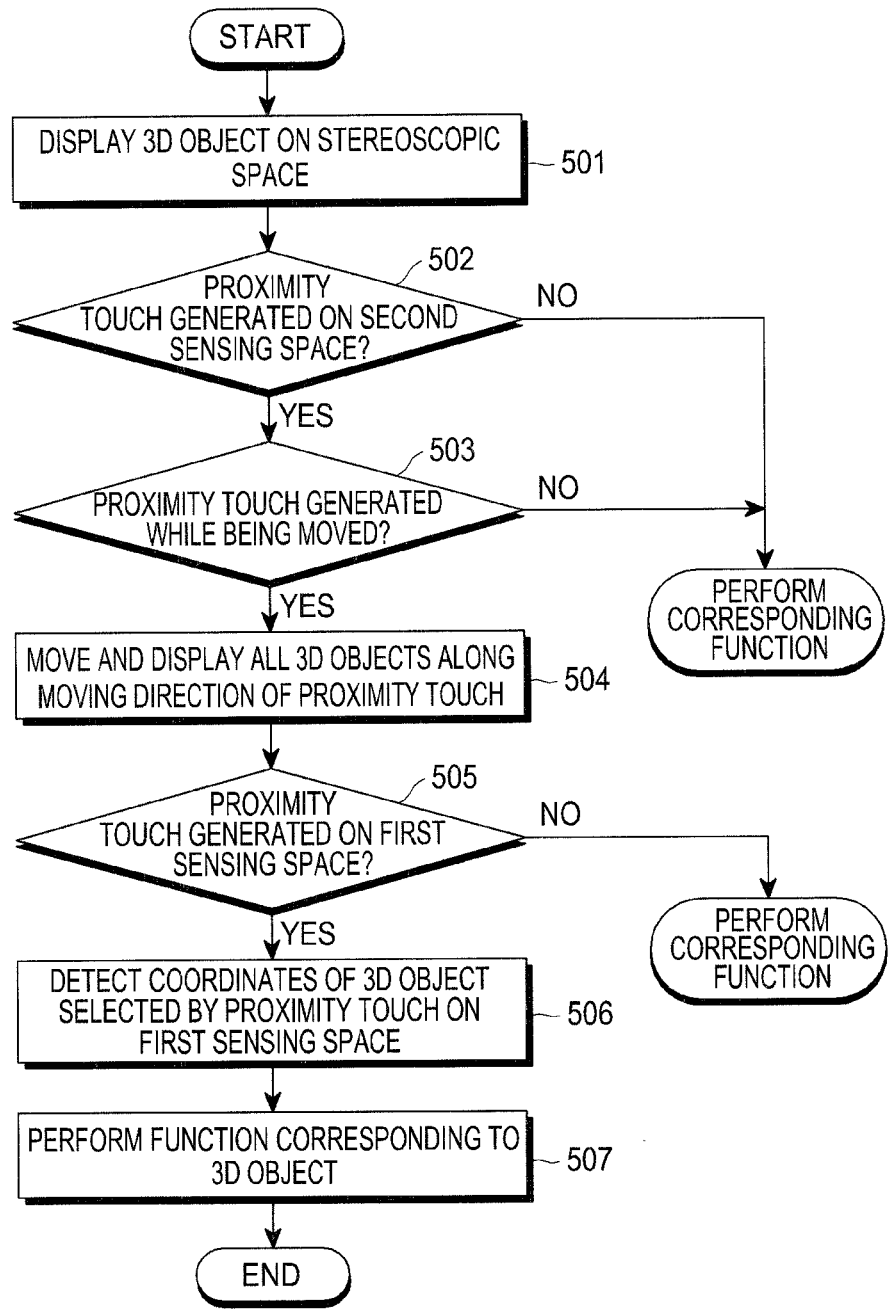
FIG. 5 is a flowchart of a process of sensing a 3D object according to a first exemplary embodiment of the present invention.
Figure 6A:
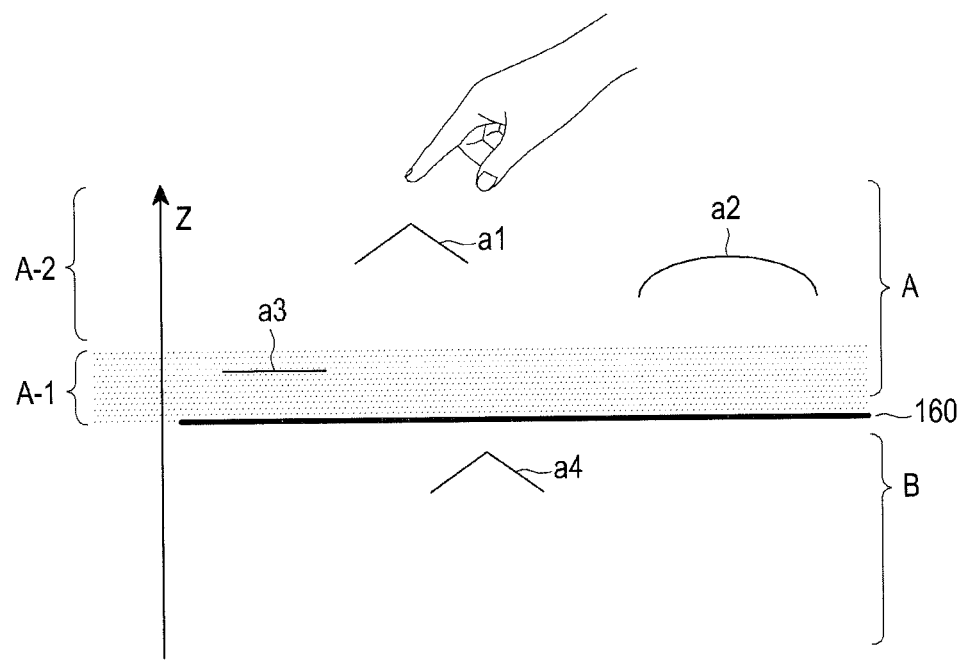
FIGS. 6A and 6B are diagrams for describing FIG. 5.
Figure 6B:
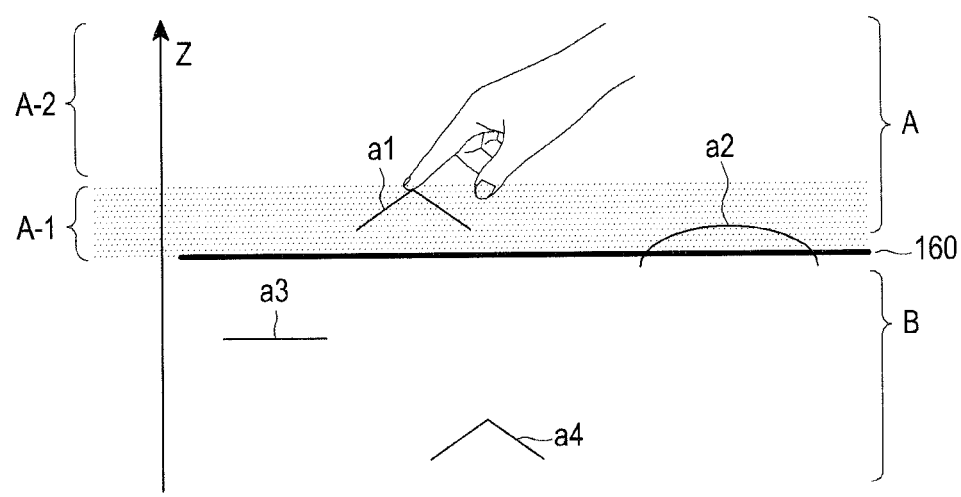

FIG. 5 is a flowchart of a process of sensing a 3D object according to the first embodiment of the present invention, and FIGS. 6A and 6B are diagrams for describing FIG. 5. Hereinafter, an exemplary embodiment of the present invention will be described in detail also with reference to FIG. 4.

Referring to FIG. 5, if a proximity touch is generated on a second sensing space in step 501 in which at least one 3D object having different 3D depths on a stereoscopic space of the display unit 160 are displayed as a stereoscopic UI, then the controller 110 senses the generated proximity touch and determines a sensing space on which the proximity touch is generated, in step 502.

If the controller 110 determines through the space input sensing unit 170 that the generated proximity touch is generated on the second sensing space of the front stereoscopic space of the display unit 160 on the stereoscopic space, then, the controller 110 senses the generation of the proximity touch on the second sensing space and determines whether the proximity touch is moved in step 502.

If the proximity touch on the second sensing space is moved and generated by the user's hand or pen, the controller 110 senses the movement in step 503 and moves and displays all the 3D objects, displayed on the virtual stereoscopic space, according to moving speed and moving direction (−Z axis) of the proximity touch in step 504. Although all the 3D objects are moved in the current embodiment of the present invention, only a 3D object displayed on the second sensing space may be moved and displayed.

Since the second sensing space has a low sensing accuracy on the second sensing space, the controller 110 does not detect a 3D object even if the proximity touch is generated. However, the controller 110 may guide the proximity touch generated on the second sensing space to move to the first sensing space, while moving all the 3D objects displayed on the stereoscopic space according to moving speed and moving direction of the proximity touch. Therefore, on the second sensing space, to sense movement of the proximity touch to the first sensing space, the controller 110 may detect only a Z value as coordinates of a position in which the proximity touch is generated.

If the proximity touch is sensed on the first sensing space of the front stereoscopic space of the display unit 160 on the stereoscopic space when the controller 110 moves and displays all the 3D objects displayed on the stereoscopic space according to the moving speed and moving direction (−Z axis) of the proximity touch in step 504, then the controller 110 senses the proximity touch on the first sensing space in step 505 and detects coordinates of a 3D object corresponding to the proximity touch generated on the first sensing space in step 506. The controller 110 performs a function corresponding to the 3D object selected by the proximity touch on the first sensing space in step 507.

Since the first sensing space has a high sensing accuracy, if the proximity touch is generated on the first sensing space, the controller 110 detects X, Y, and Z coordinates as coordinates of the generation position of the proximity touch to detect coordinates of the 3D object corresponding to the proximity touch.

The process shown in FIG. 5 will be described using FIGS. 6A and 6B as an example. As shown in FIG. 6A, when a plurality of 3D objects a1 through a4 having different 3D depths on a stereoscopic space including a front stereoscopic space A and a rear stereoscopic space B, if a proximity touch is generated on a second sensing space A-2 of the front virtual space A, then the controller 110 does not detect a 3D object corresponding to the proximity touch generated on the second sensing space A-2 of a low sensing accuracy. Thereafter, the user performs an action of pushing a desired particular 3D object in the −Z-axis direction to select the particular 3D object, such that the controller 110 moves and displays all the 3D objects a1 through a4 displayed on the stereoscopic space in the −Z-axis direction according to the moving speed of the proximity touch.

Through the foregoing action, as shown in FIG. 6B, if the proximity touch made by the user is generated on a first sensing space A1-1, then the controller 110 detects coordinates of a 3D object corresponding to the proximity touch on the first sensing space A1-1 of a high sensing accuracy.

That is, as a user's hand or pen approaches the display unit 160, the 3D object is moved toward the display unit 160 and upon generation of a proximity touch on the first sensing space A-1 of a high proximity touch reliability, the touch is sensed and coordinates of a corresponding 3D object are detected.

When generation of the proximity touch on the first sensing space A-1 is sensed, a haptic feedback such as a visual or tactile feedback may be also generated.

In addition, all the 3D objects a1 through a4 displayed on the virtual stereoscopic space are moved and displayed in the −Z-axis direction according to the moving speed of the proximity touch, thereby preventing the user's hand and the 3D object from being displayed in an overlapping manner when the user selects the 3D object.

Figure 7:
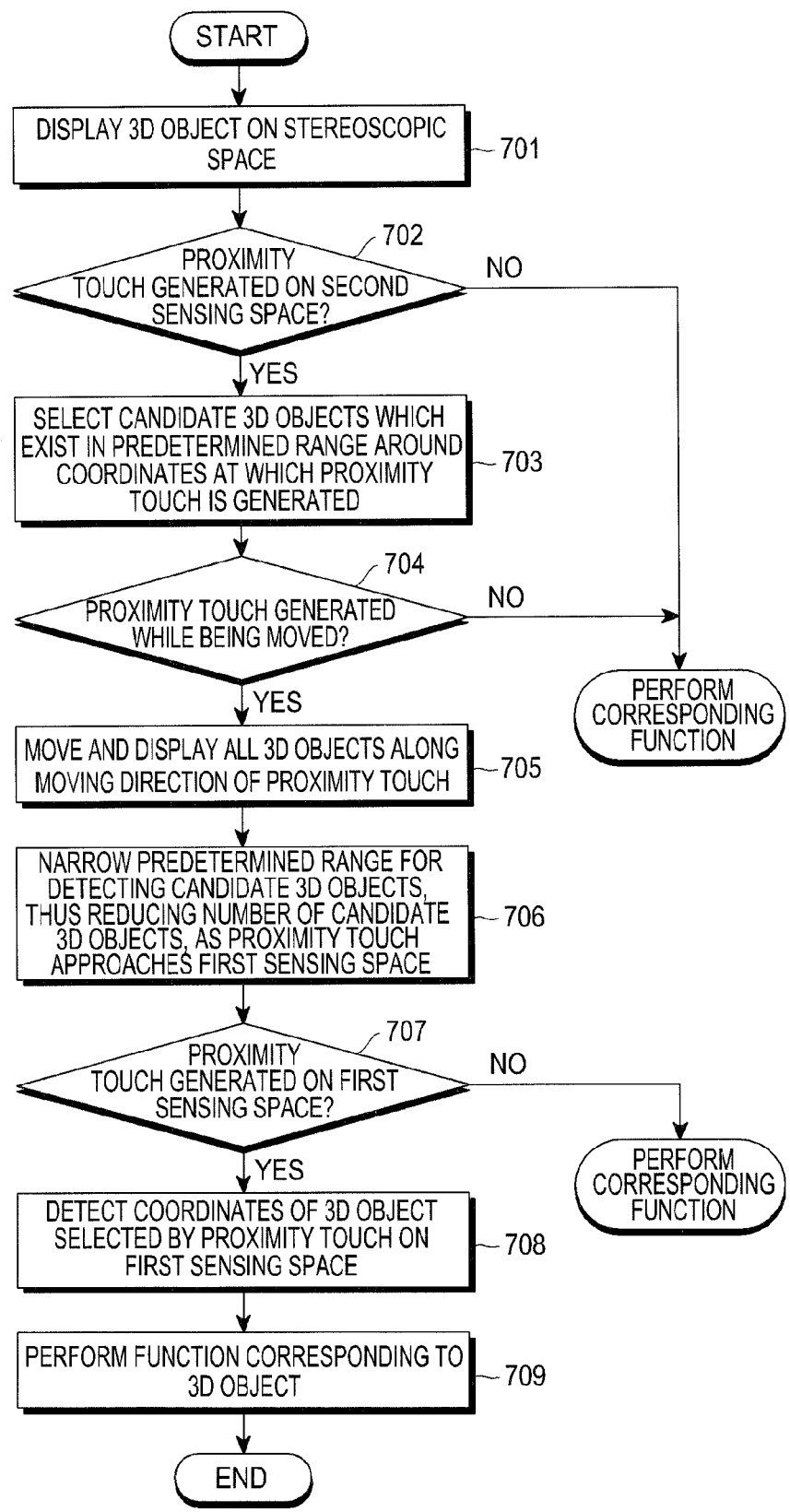
FIG. 7 is a flowchart illustrating a process of sensing a 3D object according to a second exemplary embodiment of the present invention.

FIG. 7 is a flowchart illustrating a process of sensing a 3D object according to a second exemplary embodiment of the present invention, and FIGS. 8A through 8D are diagrams for describing FIG. 7. Hereinafter, an embodiment of the present invention will be described in detail referring to FIG. 4 together.

Referring to FIG. 7, if a proximity touch is generated on a second sensing space in step 701 in which at least one 3D object having different 3D depths on a stereoscopic space of the display unit 160 are displayed as a stereoscopic UI, the controller 110 senses the generation of the touch and determines a sensing space on which the proximity touch is generated, in step 702.

If the controller 110 determines through the space input sensing unit 170 that the generated proximity touch is generated on the second sensing space of the front stereoscopic space of the display unit 160 on the stereoscopic space, then, the controller 110 senses the generation of the touch on the second sensing space in step 702 and selects, as candidate 3D objects, 3D objects which exist in a predetermined range around coordinates of a position in which the proximity touch is generated from among the at least one 3D object in step 703.

The controller 110 may select, as the candidate 3D objects, 3D objects which exist in a predetermined range around X, Y, and Z coordinates of a position in which the proximity touch is generated, or all 3D objects having a smaller value than a Z value of the X, Y, and Z coordinates of the generation position of the proximity touch.

A description of an exemplary embodiment of the present invention will be made assuming that the 3D objects which exist in the predetermined range around the X, Y, and Z coordinates of the generation position of the proximity touch are selected as the candidate 3D objects.

In step 703, after selecting the candidate 3D objects, the controller 110 determines whether the proximity touch on the second sensing space is generated while being moved.

If the proximity touch on the second sensing space is generated while being moved by the user's hand or pen, the controller 110 senses the proximity touch on the second sensing space in step 704 and moves and displays all the 3D objects according to moving speed and moving direction (−Z axis) of the proximity touch in step 705.

As the proximity touch generated while being moved on the second sensing space approaches the first sensing space of a high sensing accuracy, the accuracy of sensing the X, Y, and Z coordinates of the position of the proximity touch increases, such that the predetermined range for detecting the candidate 3D objects is reduced.

As the proximity touch generated on the second sensing space is moved and generated close to the first sensing space, the controller 110 narrows the predetermined range for detecting the candidate 3D objects, thus reducing the number of candidate 3D objects in step 706. The number of candidate 3D objects is changed according to a distance between the position of the proximity touch generated by the user's hand or pen on the second sensing space and the first sensing space, such that as the proximity touch approaches the first sensing space, the sensing accuracy is increased, thus reducing the number of selected candidate 3D objects.

Since the second sensing space has a low sensing accuracy, the controller 110 does not detect a 3D object on the second sensing space even if the proximity touch is generated. However, the controller 110 may guide the proximity touch generated on the second sensing space to move to the first sensing space, while moving all the 3D objects displayed on the stereoscopic space according to the moving speed and moving direction of the proximity touch.

When all the 3D objects are moved and displayed according to the moving speed and moving direction (−Z axis) of the proximity touch in step 706, if the proximity is sensed on the first sensing space of the front stereoscopic space of the display unit 160 on the stereoscopic space, the controller 110 senses the proximity on the first sensing space in step 707 and detects coordinates of a 3D object corresponding to the proximity touch generated on the first sensing space in step 708. In step 708, the controller 110 detects coordinates of one 3D object corresponding to the proximity touch generated on the first sensing space among the candidate 3D objects whose number is reduced until the proximity touch is generated on the first sensing space. The controller 110 performs a function corresponding to the 3D object selected by the proximity touch on the first sensing space, in step 709.

Figure 8A:
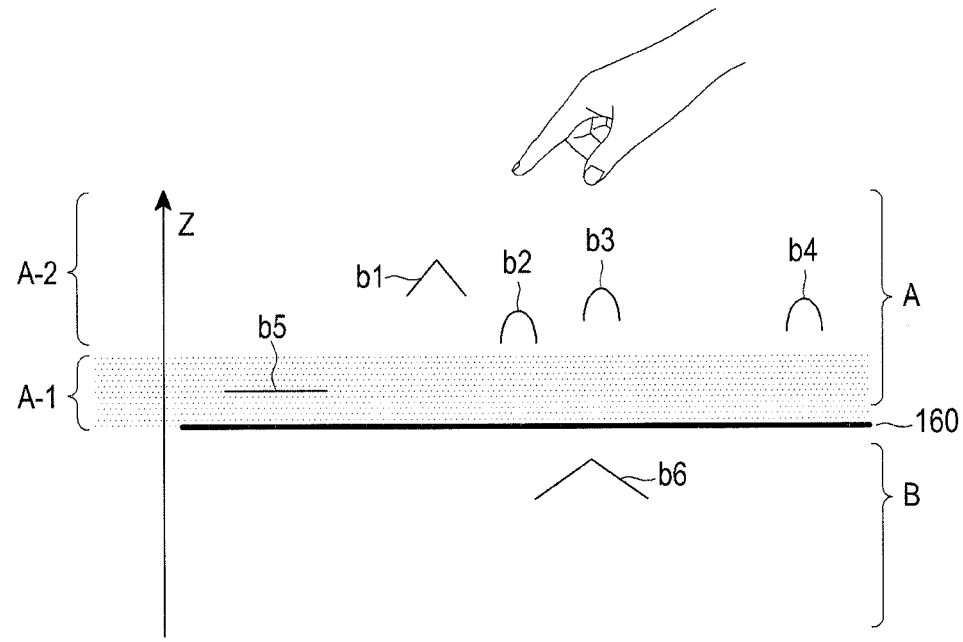
FIGS. 8A through 8D are diagrams for describing FIG. 7.
Figure 8B:
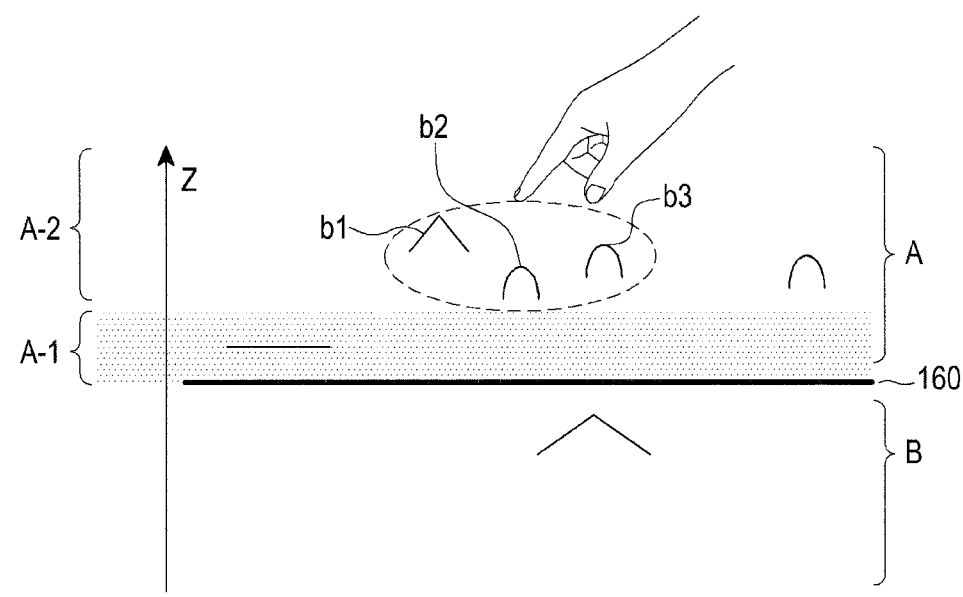

The process shown in FIG. 7 is described below with reference to FIGS. 8A through 8D. When a plurality of 3D objects b1 through b6 having different 3D depths on a stereoscopic space including a front stereoscopic space A and a rear stereoscopic space B, if a proximity touch is generated on a second sensing space A-2 of the front virtual space A of the display unit 160 as shown in FIG. 8B, then the controller 110 selects candidate 3D objects b1, b2, and b3, without detecting a 3D object corresponding to the proximity touch generated on the second sensing space A-2 of a low sensing accuracy. The candidate 3D objects b1, b2, and b3 are 3D objects which exist in a predetermined range around coordinates of the position of the proximity touch generated on the second sensing space A-2.

Figure 8C:
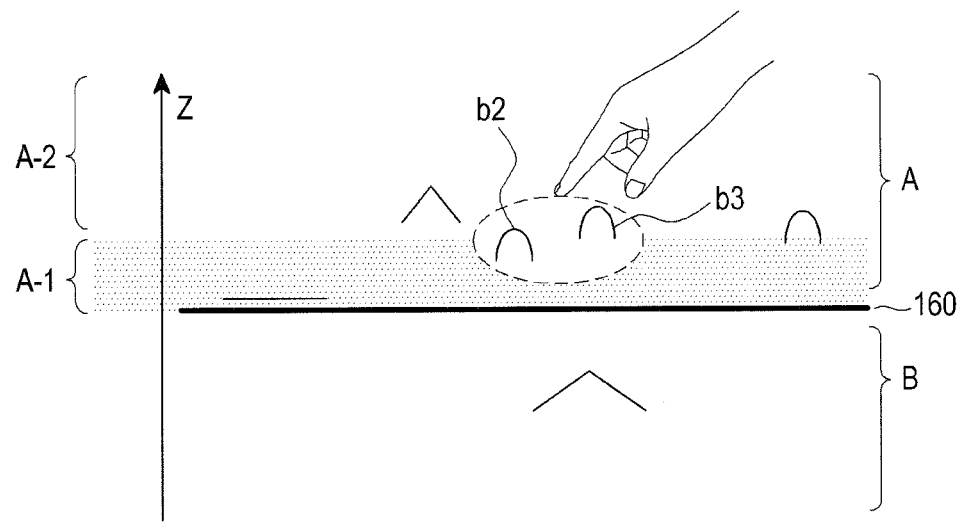
Figure 8D:
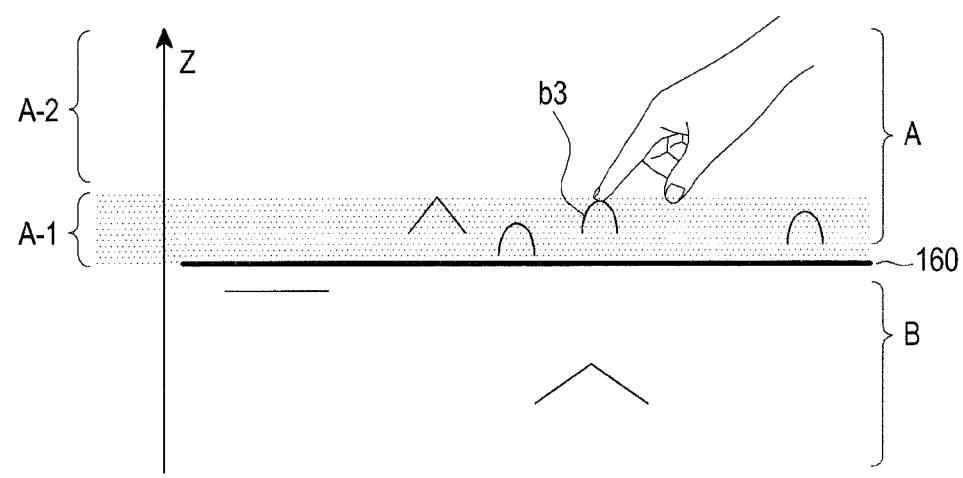

When the proximity touch generated on the second sensing space is generated while being moved to the first sensing space in FIG. 8B, then all the objects b1-b6 are moved along the moving direction of the proximity touch as shown in FIG. 8C, and as the proximity touch approaches the first sensing space, that is, as the sensing accuracy is increased, the number of selected 3D objects (for example, b2 and b3) is reduced. Thereafter, when the proximity touch generated on the second sensing space is generated on the first sensing space as shown in FIG. 8D, the controller 110 detects coordinates of one 3D object b3 corresponding to the proximity touch between the candidate 3D objects b2 and b3, and performs a corresponding function. When generation of the proximity touch on the first sensing space A-1 is sensed, a haptic feedback such as a visual or tactile feedback may be also generated.

In the second exemplary embodiment of the present invention, until the proximity touch generated on the second sensing space of a low sensitivity is moved and generated on the first sensing space of a high sensitivity, all the 3D objects are moved along the moving direction of the proximity touch, the number of candidate 3D objects detected is reduced during movement of all the 3D objects, and when the proximity touch is generated on the first sensing space, coordinates of one 3D object corresponding to the proximity touch among the candidate 3D objects is detected.

However, until the proximity touch generated on the second sensing space is generated on the first sensing space, the candidate 3D objects among all the 3D objects may be moved along the moving direction of the proximity touch, the number of candidate 3D objects may be reduced during movement of the candidate 3D objects, and when the proximity touch is generated on the first sensing space, coordinates of one 3D object corresponding to the proximity touch among the candidate 3D objects may be detected.

Figure 9A:
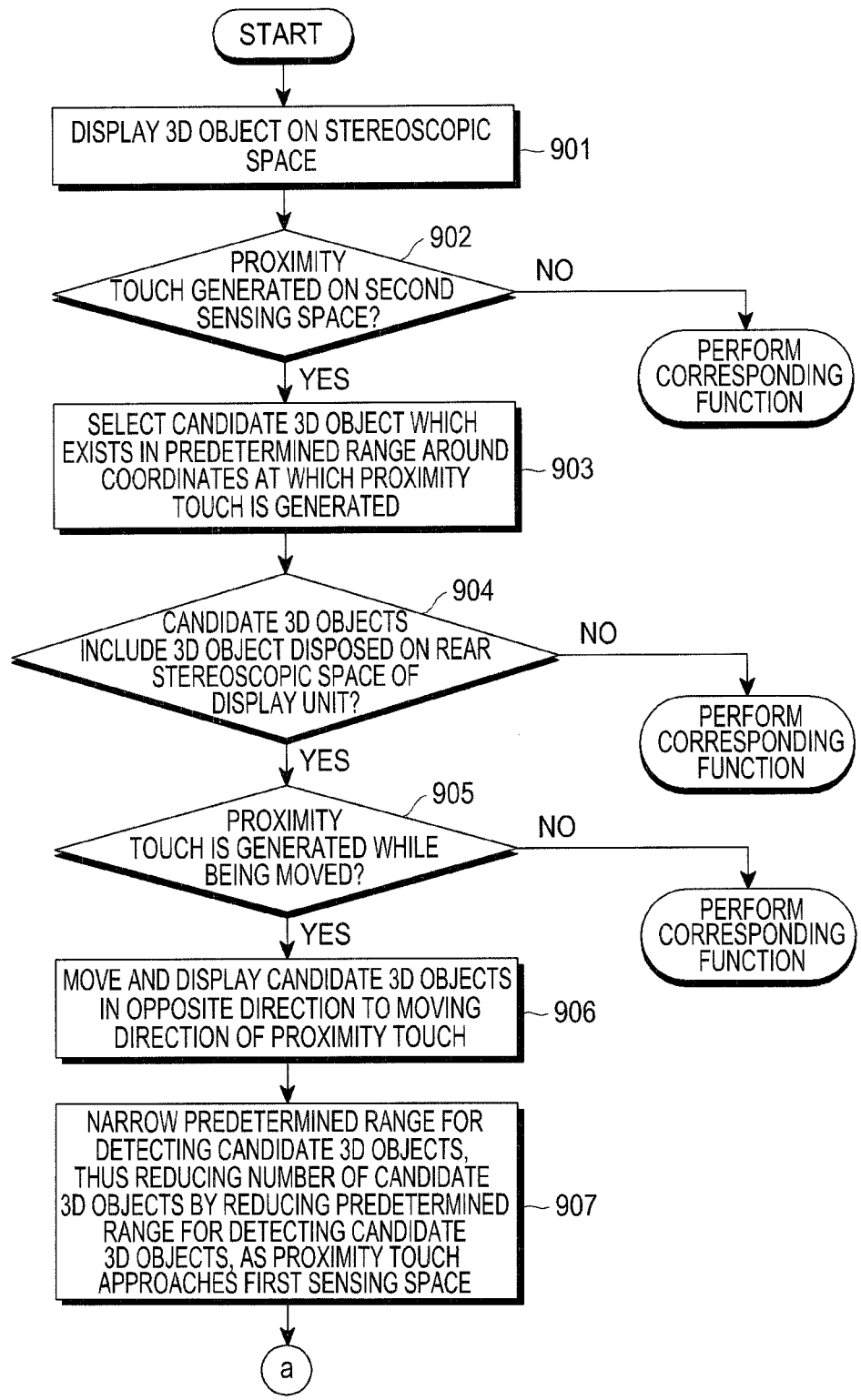
FIGS. 9A and 9B are flowcharts illustrating a process of sensing a 3D object according to a third exemplary embodiment of the present invention.
Figure 9B:
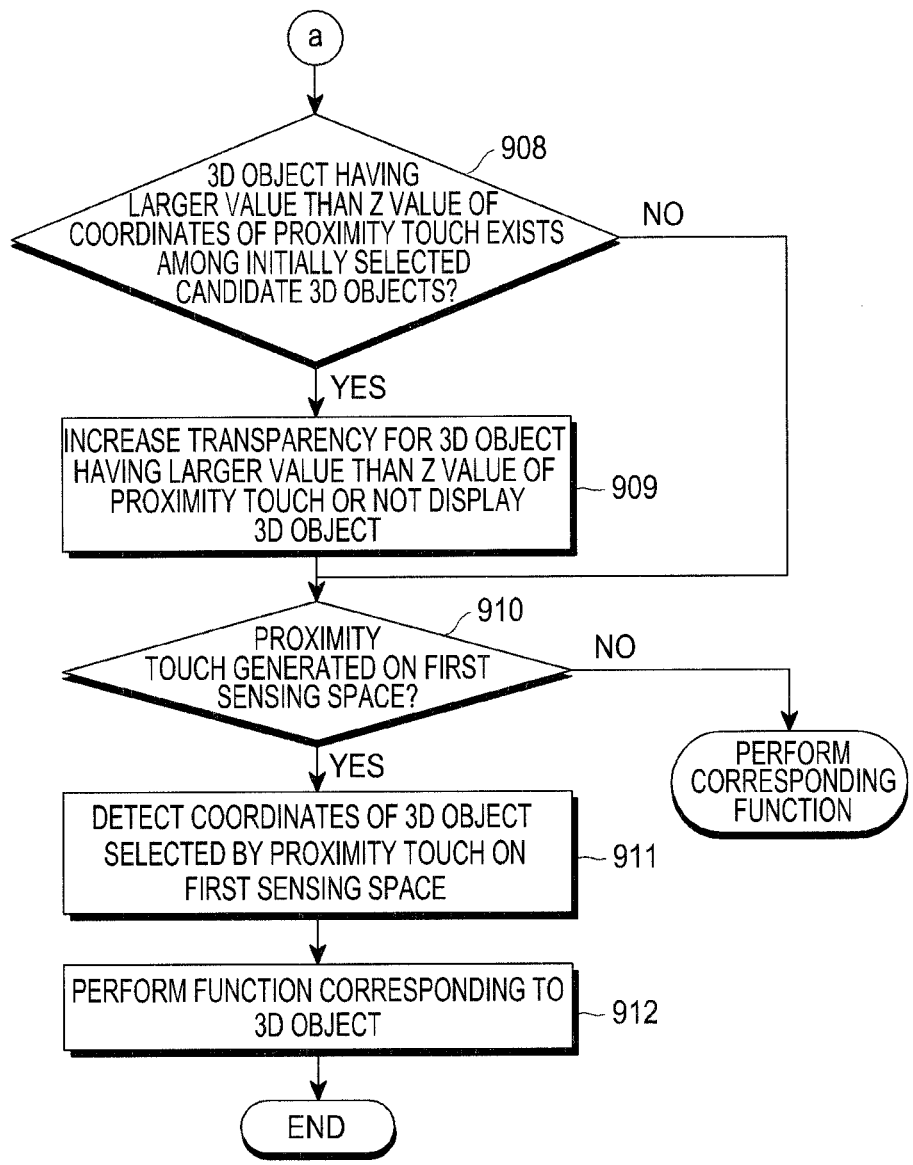

FIGS. 9A and 9B are flowcharts illustrating a process of sensing a 3D object according to a third embodiment of the present invention, and FIGS. 10A through 10D are diagrams for describing FIGS. 9A and 9B. Hereinafter, an exemplary embodiment of the present invention will be described in detail referring to FIG. 4 together.

Referring to FIGS. 9A and 9B, if a proximity touch is generated on a second sensing space in step 901 in which at least one 3D object having different 3D depths on a stereoscopic space of the display unit 160 are displayed as a stereoscopic UI, the controller 110 senses the generation of the touch and determines a sensing space on which the proximity touch is generated, in step 902.

If the controller 110 determines through the space input sensing unit 170 that the generated proximity touch is generated on the second sensing space of the front stereoscopic space of the display unit 160 on the stereoscopic space, then the controller 110 senses the generation of the proximity touch in the second sensing space in step 902 and selects, as candidate 3D objects, 3D objects which exist in a predetermined range around coordinates of a position in which the proximity touch is generated from among the at least one 3D object in step 903.

The number of selected candidate 3D objects is changed according to a distance between the position of the proximity touch generated by the user's hand or pen on the second sensing space and the first sensing space, and the selected candidate 3D objects are used to guide the proximity touch generated by the user's hand or pen such that the proximity touch generated on the second sensing space moves to the first sensing space.

According to an exemplary embodiment of the present invention, the controller 110 may detect, as candidate 3D objects, 3D objects which exist in a predetermined range around X, Y, and Z coordinates of the generation position of the proximity touch, or select, as candidate 3D objects, all the 3D objects having a smaller value than the Z value of the coordinates of the generation position of the proximity touch.

After selecting the candidate 3D objects in step 903, the controller 110 determines whether 3D objects disposed on a rear stereoscopic space of the display unit 160 exist among the candidate 3D objects.

If the candidate 3D objects include the 3D objects disposed on the rear stereoscopic space of the display unit 160, the controller 110 senses the 3D objects disposed on the rear stereoscopic space and determines whether the proximity touch on the second sensing space is generated while being moved in step 904.

If the proximity touch on the second sensing space is generated while being moved by the user's hand or pen, the controller 110 senses the proximity touch in step 905 and moves and displays the candidate 3D objects according to the moving speed of the proximity touch, but in an opposite direction (Z axis) to the moving direction (−Z axis) of the proximity touch in step 906.

As the proximity generated while being moved on the second sensing space approaches the first sensing space of a high sensing accuracy, the accuracy of sensing X, Y, and Z coordinates of the position of the proximity touch is increased, such that the predetermined range for detecting candidate 3D objects is reduced.

Therefore, as the proximity touch generated on the second sensing space is moved and generated close to the first sensing space, the controller 110 narrows the predetermined range for detecting the candidate 3D objects, thus reducing the number of candidate 3D objects moved in an opposition direction to the moving direction of the proximity touch and displays those candidate 3D objects in step 907.

When the number of candidate 3D objects moved in the opposite direction to the moving direction of the proximity touch is reduced and the candidate 3D objects are displayed, the controller 110 determines whether a 3D object which has a larger value than the Z value of the X, Y, and Z coordinates of the position of the proximity touch exists among the initially selected candidate 3D objects in step 908.

If there is such a 3D object, the controller 110 senses the 3D object having the larger object in step 908 and increases a transparency for the 3D object having a large value than the Z value of the X, Y, and Z coordinates of the position of the proximity touch or does not display the 3D object in step 909. Through step 909, the 3D object may be prevented from overlapping with the user's hand or pen which generates the proximity touch.

The 3D object whose transparency is increased or which is not displayed may restore its original transparency or may be displayed again, if one 3D object corresponding to the proximity touch is detected or generation of the proximity touch is terminated.

As such, since the second sensing space has a low sensing accuracy, the controller 110 does not detect a 3D object on the second sensing space even if the proximity touch is generated. However, the controller 110 may guide the proximity touch generated on the second sensing space to move to the first sensing space, while moving the candidate 3D objects in the opposite direction to the moving direction of the proximity touch.

When the candidate 3D objects are moved and displayed in the opposite direction (Z axis) to the moving direction (−Z axis) of the proximity touch while reducing the number of candidate 3D objects, if the proximity touch is sensed on the first sensing space of the front stereoscopic space of the display unit 160 on the stereoscopic space, the controller 110 senses the proximity touch on the first sensing space in step 910 and detects coordinates of a 3D object corresponding to the proximity touch generated on the first sensing space in step 911. In step 911, the controller 110 detects coordinates of one 3D object corresponding to the proximity touch generated on the first sensing space among the candidate 3D objects which are moved together with reduction of the number of candidate 3D objects, until the proximity touch is generated on the first sensing space. The controller 110 performs a function corresponding to the 3D object selected by the proximity touch on the first sensing space in step 912.

Figure 10A:
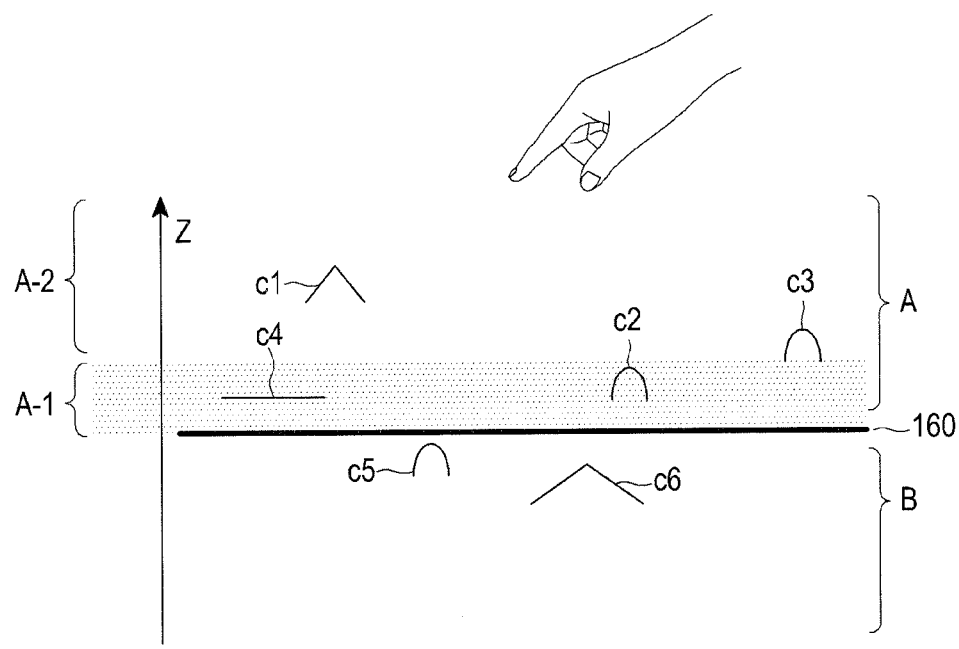
FIGS. 10A through 10D are diagrams for describing FIGS. 9A and 9B.
Figure 10B:
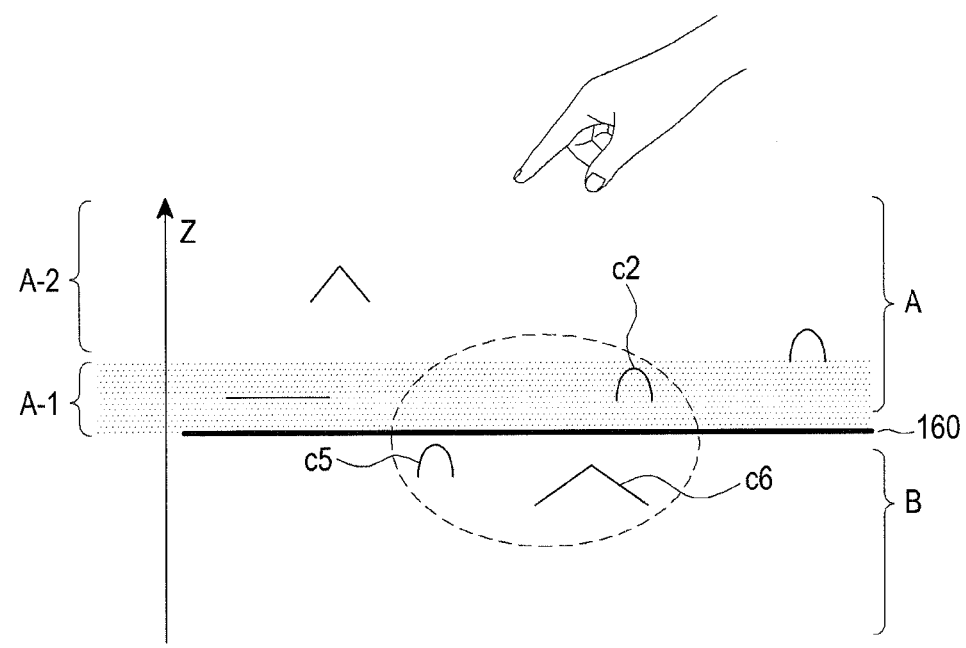

The process shown in FIGS. 9A and 9B will be described with reference to FIGS. 10A through 10D. When a plurality of 3D objects c1 through c6 having different 3D depths on a stereoscopic space including a front stereoscopic space A and a rear stereoscopic space B, if a proximity touch is generated on a second sensing space A-2 of the front virtual space A of the display unit 160 by the user's hand or pen as shown in FIG. 10B, then the controller 110 selects candidate 3D objects c2, c5, and c6, without detecting a 3D object corresponding to the proximity touch generated on the second sensing space A-2 of a low sensing accuracy. The controller 110 determines that the selected candidate 3D objects c2, c5, and c6 include candidate 3D objects (for example, c5 and c6) which are disposed on the rear stereoscopic space B of the display unit 160.

Figure 10C:
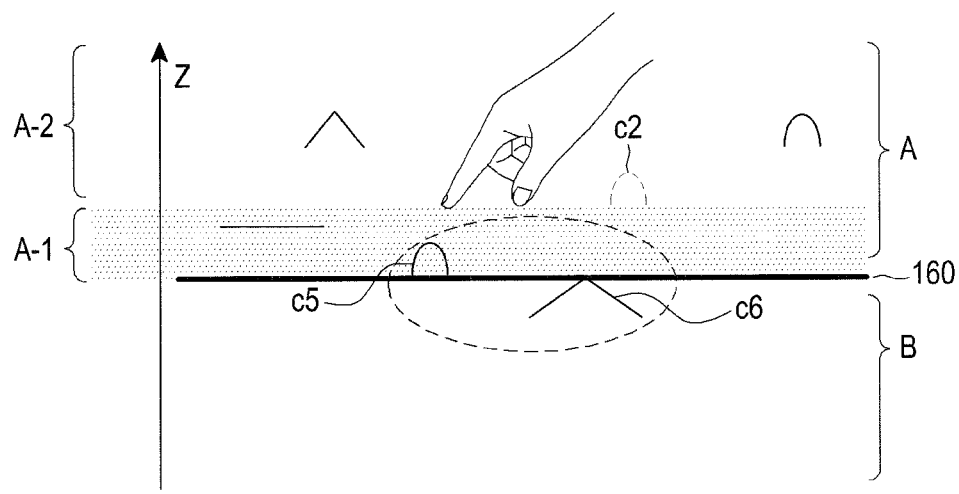

Therefore, if the proximity touch on the second sensing space is generated while being moved to the first sensing space A-1, the controller 110 moves the candidate 3D objects in the opposite direction (Z axis) to the moving direction (−Z axis) of the proximity touch as shown in FIG. 10C, and as the proximity touch approaches the first sensing space A-1, and the sensing accuracy is increased, the number of candidate 3D objects (for example, c5 and c6) is reduced.

Hence, as the proximity touch on the second sensing space A-2 approaches the first sensing space A-1, the candidate 3D objects c5 and c6 displayed on the rear stereoscopic space B are displayed while being moved toward the display unit 160.

When the candidate 3D objects are moved in the opposite direction to the moving direction of the proximity touch, the controller 110 determines whether the initially selected candidate 3D objects c2, c5, and c6 include a 3D object (for example, c2) having a larger value than the Z value of the coordinates of the generation position of the proximity touch. If there is such a 3D object c2, the controller 110 increases a transparency for that 3D object c2 or does not display the 3D object c2, thus preventing the 3D object c2 from overlapping with the user's hand or pen which generates the proximity touch.

Figure 10D:
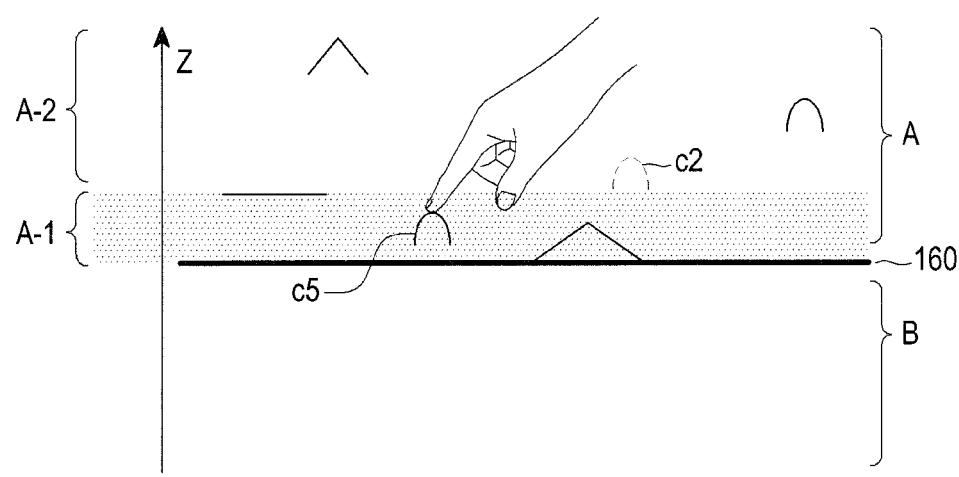

Thereafter, as shown in FIG. 10D, if the proximity touch generated on the second sensing space is generated on the first sensing space, the controller 110 detects coordinates of one 3D object c5 corresponding to the proximity touch from the candidate 3D objects c5 and c6 and performs a corresponding function. When generation of the proximity touch on the first sensing space A-1 is sensed, a haptic feedback such as a visual or tactile feedback may be also generated.

Figure 11A:
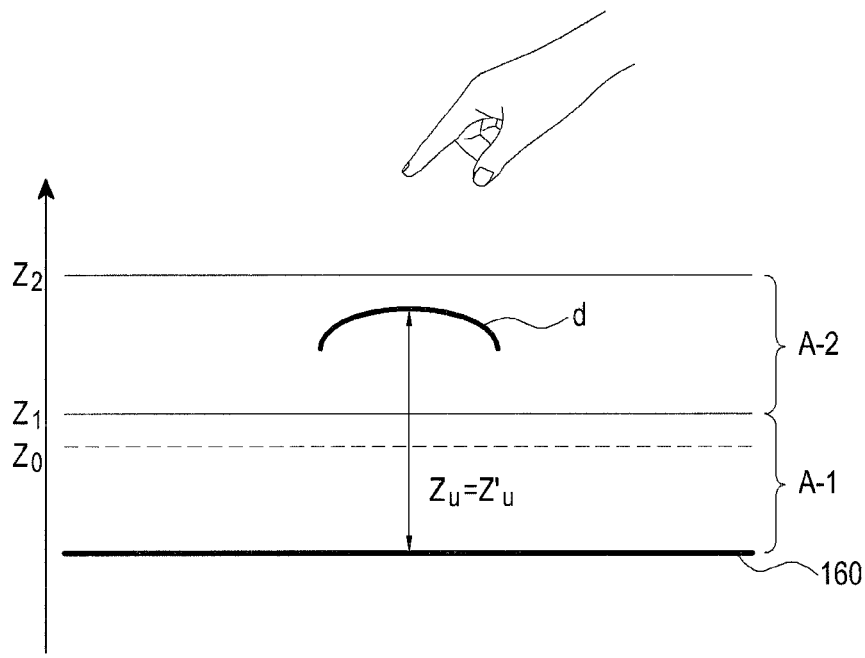
FIGS. 11A and 11B are diagrams for describing a movement amount of a proximity touch for detecting coordinates of a 3D object according to an exemplary embodiment of the present invention.
Figure 11B:
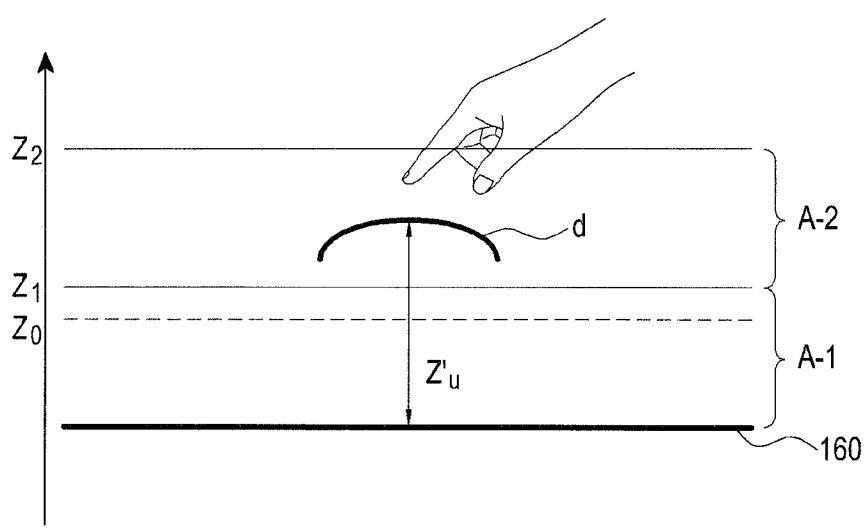

FIGS. 11A and 11B are diagrams for describing a movement amount of a proximity touch for detecting coordinates of a 3D object according to an exemplary embodiment of the present invention.

When a proximity touch generated on a second sensing space of a low-sensitivity in a display unit is moved to a first sensing space of a high sensitivity, predetermined 3D objects (at least 3D objects or candidate 3D objects disposed on a stereoscopic space) are also moved. When the proximity touch is generated on the first sensing space, a user's hand or pen which generates the proximity touch on the first sensing space meets one of the candidate 3D objects, such that coordinates of the 3D object corresponding to the proximity touch among the candidate 3D objects are detected.

As such, in order to allow the user's hand or pen which generates the proximity touch on the first sensing space to meet one of the predetermined 3D objects, which corresponds to the proximity touch, the movement amount of the predetermined 3D objects may be adjusted using Equation 1, which will be described below with reference to FIGS. 11A and 11B:

$$Z'_u = \begin{cases} Z_u & Z > Z_2 \\ Z_u - \dfrac{Z_u - Z_0}{Z_2 - Z_0} & Z_0 < Z \le Z_2 \\ Z & Z \le Z_0, \end{cases} \quad (1)$$

where $Z_2$ indicates a maximum Z value of a second sensing space, $Z_1$ indicates a maximum Z value of a first sensing space, $Z_u$ indicates a position of a 3D object d in case of absence of a proximity touch, Z indicates a position of a proximity touch generated by a user's hand or pen, $Z'_u$ indicates a position of the 3D object d according to the generation position of the proximity touch, and $Z_0$ indicates a position in which the 3D object d meets the user's hand or pen which generates the proximity touch on the first sensing space.

According to Equation 1, the movement amount of the proximity touch is adjusted such that if Z is greater than $Z_2$, $Z'_u = Z_u$, and if Z is equal to $Z_0$, $Z'_u = Z_0 = Z$.

Figure 12:
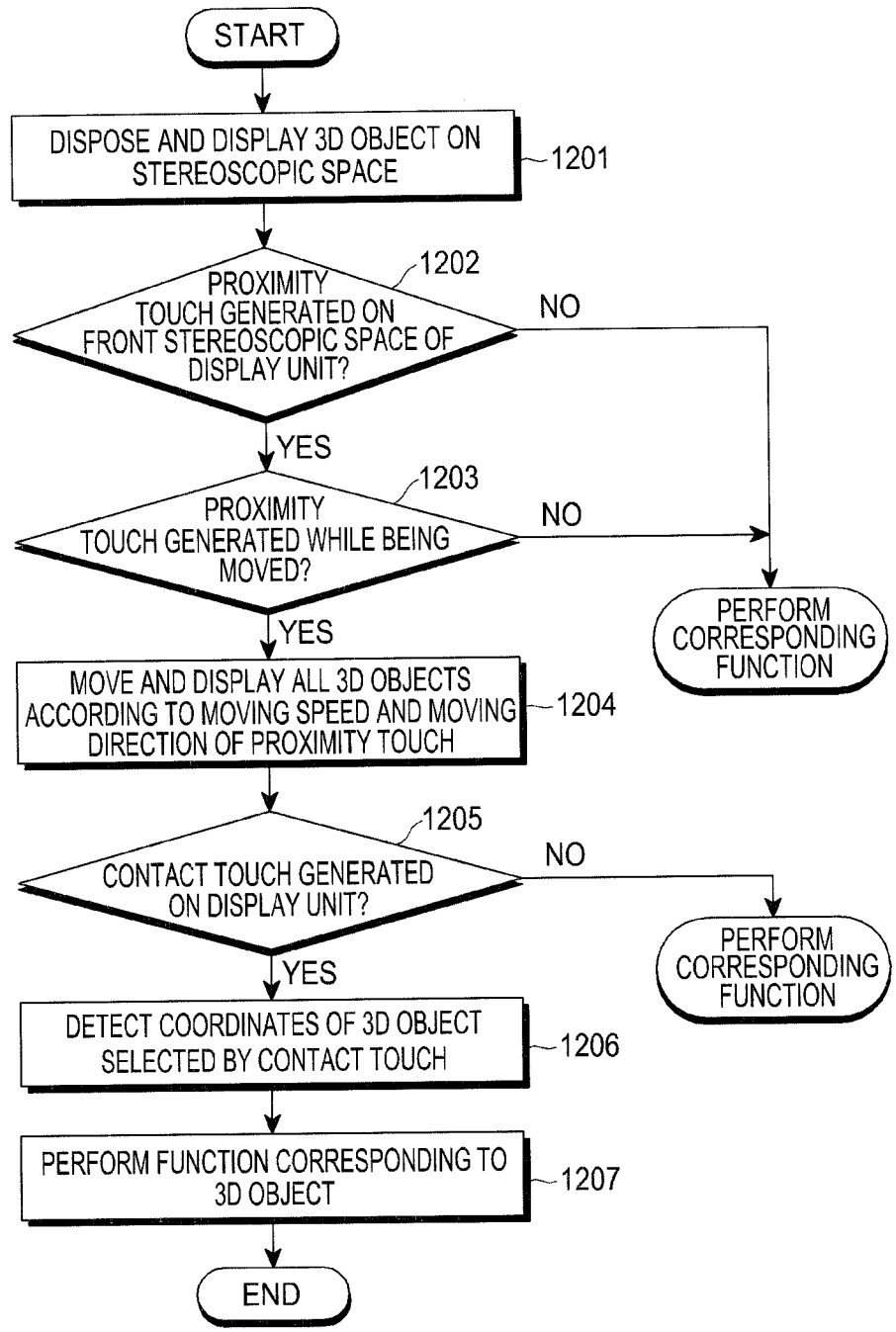
FIG. 12 is a flowchart illustrating a process of sensing a 3D object according to a fourth exemplary embodiment of the present invention.
Figure 13A:
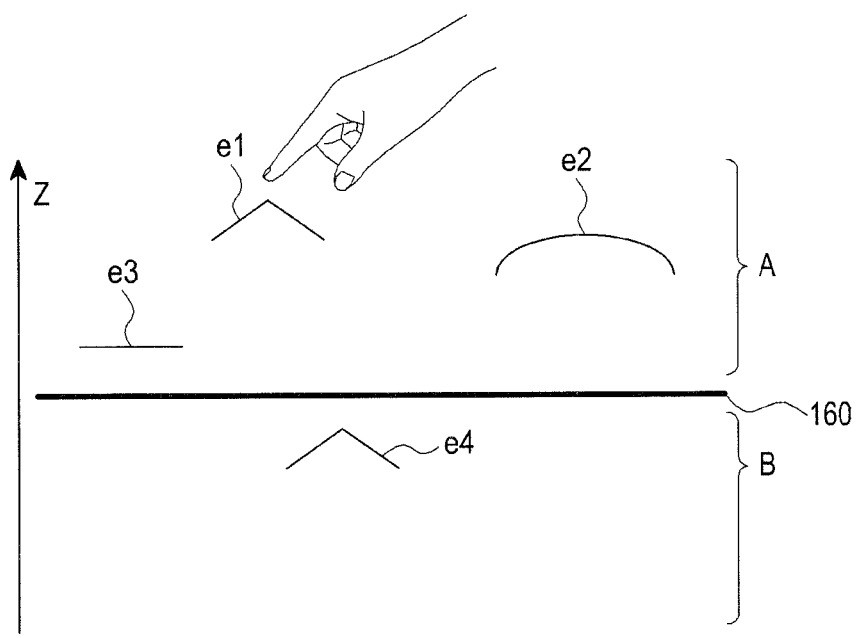
FIGS. 13A and 13B are diagrams for describing FIG. 12.
Figure 13B:
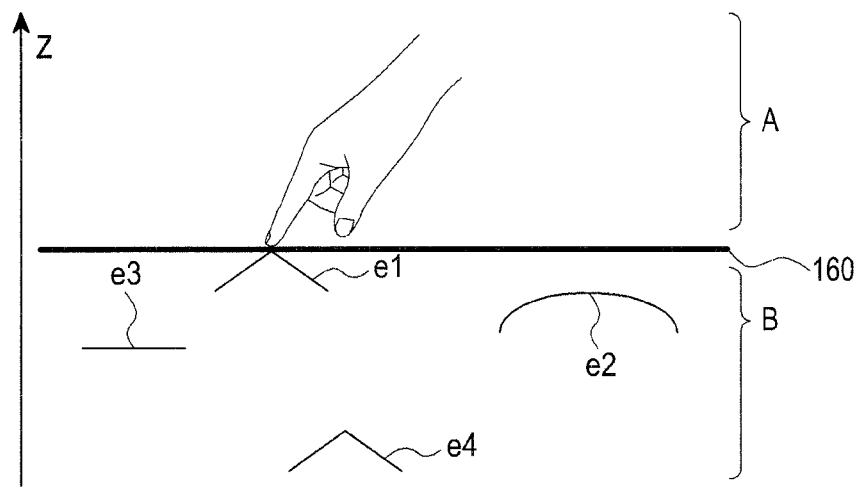

FIG. 12 is a flowchart illustrating a process of sensing a 3D object according to a fourth exemplary embodiment of the present invention, and FIGS. 13A and 13B are diagrams for describing FIG. 12. Hereinafter, an embodiment of the present invention will be described in detail referring to FIG. 4 together.

Referring to FIG. 12, if a proximity touch is generated on a front stereoscopic space of the display unit 160 in step 1201 in which at least one 3D object having different 3D depths on a stereoscopic space of the display unit 160 are displayed as a stereoscopic UI, the controller 110 senses the generation of the touch and determines a sensing space on which the proximity touch is generated, in step 1202.

If a proximity touch is generated while being moved by a user's hand or pen on a front stereoscopic space of the display unit 160, the controller 110 senses the generation of the proximity touch in step 1203 and moves and displays all the 3D objects displayed on the stereoscopic space according to moving speed and moving direction (−Z axis) of the proximity touch in step 1204. While all the 3D objects are moved in the fourth exemplary embodiment of the present invention, it is also possible that only 3D objects displayed on the front stereoscopic space of the display unit 160 may be moved and displayed.

On the front stereoscopic space of the display unit 160, the controller 110 does not detect a 3D object even if the proximity touch is generated. However, the controller 110 may guide the proximity touch generated on the front stereoscopic space of the display unit 160 to contact the display unit 160, while moving all the 3D objects displayed on the stereoscopic space according to the moving speed and moving direction of the proximity touch. Thus, to sense movement of the proximity touch to the display unit 160 on the front stereoscopic space of the display unit 160, the controller 110 may detect only a Z value of coordinates of the generation position of the proximity touch.

If a contact touch is generated on the display unit 160 when all the 3D objects displayed on the stereoscopic space are moved and displayed according to the moving speed and moving direction (−Z axis) of the proximity touch in step 1204, the controller 110 senses the contact touch in step 1205 and detects X, Y, and Z coordinates of a 3D object corresponding to the contact touch generated on the display unit 160 in step 1206. The controller 110 performs a function corresponding to the 3D object selected by the contact touch on the display unit 160 in step 1207.

The process shown in FIG. 12 will be described with reference to FIGS. 13A and 13B. When a plurality of 3D objects e1 through e4 having different 3D depths on a stereoscopic space including a front stereoscopic space A and a rear stereoscopic space B, if a proximity touch is generated on the front virtual space A of the display unit 160 as shown in FIG. 13A, then the controller 110 does not detect a 3D object corresponding to the proximity touch generated on the front stereoscopic space A. Thereafter, the user performs an action of pushing a desired particular 3D object in the −Z-axis direction to select the particular 3D object, such that the controller 110 moves and displays all the 3D objects e1 through e4 displayed on the stereoscopic space along the −Z-axis direction according to the moving speed of the proximity touch.

Through the foregoing action, as shown in FIG. 13B, if a contact touch made by the user is generated on the display unit 160, the controller 110 detects coordinates of a 3D object corresponding to the proximity touch generated on the display unit 160.

That is, as the user's hand or pen approaches the display unit 160, the 3D object is moved toward the display unit 160 and upon generation of the contact touch on the display unit 160, the touch is sensed and coordinates of a corresponding 3D object are detected. When generation of the proximity touch on the first sensing space A-1 is sensed, a haptic feedback such as a visual or tactile feedback may be also generated.

In addition, all the 3D objects e1 through e4 displayed on the virtual stereoscopic space are moved and displayed in the −Z-axis direction according to the moving speed of the proximity touch, thereby preventing the user's hand and the 3D object from being displayed in an overlapping manner when the user selects the 3D object.

As is apparent from the foregoing description, by providing an apparatus and method for sensing a 3D object according to exemplary embodiments of the present invention, the sensitivity of the 3D object displayed as a stereoscopic UI on the stereoscopic space can be improved and the 3D object can be displayed without overlapping an object such as a hand.

In addition, a proximity touch generated in a low-sensitivity space of the 3D object on the stereoscopic space is guided to move to a space of a high sensitivity with respect to the 3D object.

Moreover, a natural interface can be realized by removing visual unreality between the hand and the 3D object, and high-reliability user experiences can be provided by solving limitations in performance with respect to the proximity touch by means of the UI.

Exemplary embodiments of the present invention can be embodied as code that is readable by a computer on a non-transitory computer-readable recording medium. The computer-readable recording medium includes all kinds of recording devices storing data that is readable by a computer system. Examples of the non-transitory computer-readable recording medium include read-only memory (ROM), random access memory (RAM), CD-ROMs, magnetic tapes, floppy disks, optical data storage devices, and carrier waves such as transmission over the Internet. The computer readable recording medium can also be distributed over network coupled computer systems so that the computer readable code is stored and executed in a distributed fashion.

While certain exemplary embodiments of the invention has have been shown and described herein with reference to a certain preferred embodiments thereof, it will be understood by those skilled in the art that various changes in form and details may be made therein without departing from the spirit and scope of the invention as defined by the appended claims and their equivalents.

What is claimed is:

1. An apparatus for sensing a three-dimensional (3D) object, the apparatus comprising:
a display unit comprising a first sensing space in which a sensitivity with respect to a proximity touch is higher than a threshold value and a second sensing space in which a sensitivity with respect to the proximity touch is lower than the threshold value, on a stereoscopic space on which at least one 3D object is disposed; and
a controller configured to:
move predetermined 3D objects in a predetermined direction if the proximity touch is generated on the second sensing space and the proximity touch generated on the second sensing space is moved,
detect coordinates of the 3D object corresponding to the proximity touch generated on the first sensing space if the proximity touch generated on the second sensing space is moved and generated on the first sensing space,
perform a function corresponding to the 3D object, and
when the controller is unable to detect the coordinates of the 3D object, determine candidate 3D objects, and detect the 3D object among the candidate 3D objects according to a motion of the proximity touch.

2. The apparatus of claim 1, wherein the stereoscopic space comprises a front stereoscopic space corresponding to a Z-axis direction of the display unit and a rear stereoscopic space corresponding to a −Z-axis direction of the display unit, and
wherein the front stereoscopic space of the display unit comprises the first sensing space comprising a predetermined space in the Z-axis direction from the display unit on which at least one proximity sensors are disposed and the second sensing space comprising a predetermined space in the Z-axis direction from a maximum Z value of the first sensing space.

3. The apparatus of claim 1, wherein if the proximity touch is generated on the second sensing space, the controller moves and displays the at least one 3D object disposed on the stereoscopic space along a moving direction in which the proximity touch is generated, and
if the proximity touch generated on the second sensing space is moved and generated on the first sensing space, the controller stops moving the at least one 3D object and detects coordinates of one 3D object corresponding to the proximity touch among the at least one 3D object.

4. The apparatus of claim 3, wherein to allow a user's hand or pen which generates the proximity touch to meet the one 3D object corresponding to the proximity touch among the at least one 3D object on the first sensing space, the controller adjusts a movement amount of the at least one 3D object which are moved on the second sensing space by using the following equation:

$$Z'_u = Z_u - \begin{array}{ll} Z_u & Z > Z_2 \\ \dfrac{Z_u - Z_0}{Z_2 - Z_0} & Z_0 < Z \le Z_2 \\ Z & Z \le Z_0 \end{array}$$

where $Z_2$ indicates a maximum Z value of the second sensing space, $Z_1$ indicates a maximum Z value of the first sensing space, $Z_u$ indicates a position of the 3D object in case of absence of the proximity touch, Z indicates a position of the proximity touch generated by the user's hand or pen, $Z'_u$ indicates a position of the 3D object according to the generation position of the proximity touch, and $Z_0$ indicates a position in which the 3D object meets the user's hand or pen which generates the proximity touch on the first sensing space.

5. The apparatus of claim 1, wherein if the proximity touch is generated on the second sensing space, the controller detects a Z value of X, Y, and Z coordinates of the proximity touch to detect a moving direction of the proximity touch, and if the proximity touch is generated on the first sensing space, the controller detects X, Y, and Z coordinates of the proximity touch to detect coordinates of the one 3D object corresponding to the proximity touch.

6. The apparatus of claim 1, wherein, if the proximity touch is generated on the second sensing space, the controller selects the candidate 3D objects from among the at least one 3D object disposed on the stereoscopic space,
the controller moves and displays all the 3D objects along a moving direction in which the proximity touch is generated,
the controller reduces a number of the candidate 3D objects as a distance between the generation position of the proximity touch and the first sensing space decreases, and
the controller detects coordinates of the one 3D object corresponding to the proximity touch among the candidate 3D objects if the proximity touch generated on the second sensing space is moved and generated on the first sensing space.

7. The apparatus of claim 6, wherein the controller selects, as the candidate 3D objects, the 3D objects which exist in a predetermined range around X, Y, and Z coordinates of the generation position of the proximity touch.

8. The apparatus of claim 6, wherein as the proximity touch generated on the second sensing space is moved and approaches the first sensing space, an accuracy of coordinates of the proximity touch is increased, such that the controller narrows a predetermined range for detecting the candidate 3D objects, thus reducing the number of candidate 3D objects.

9. The apparatus of claim 6, wherein to allow a user's hand or pen which generates the proximity touch to meet the one 3D object corresponding to the proximity touch among the candidate 3D objects on the first sensing space, the controller adjusts a movement amount of the candidate 3D objects by using the following equation:

$$Z'_u = Z_u - \begin{array}{ll} Z_u & Z > Z_2 \\ \dfrac{Z_u - Z_0}{Z_2 - Z_0} & Z_0 < Z \le Z_2 \\ Z & Z \le Z_0 \end{array}$$

where $Z_2$ indicates a maximum Z value of the second sensing space, $Z_1$ indicates a maximum Z value of the first sensing space, $Z_u$ indicates a position of the 3D object in case of absence of the proximity touch, Z indicates a position of the proximity touch generated by the user's hand or pen, $Z'_u$ indicates a position of the 3D object according to the generation position of the proximity touch, and $Z_0$ indicates a position in which the 3D object meets the user's hand or pen which generates the proximity touch on the first sensing space.

10. The apparatus of claim 1, wherein, if the proximity touch is generated on the second sensing space, the controller selects the candidate 3D objects from among the at least one 3D object disposed on the stereoscopic space, if the 3D object disposed on the rear stereoscopic space of the display unit exists among the selected candidate 3D objects, the controller moves and displays the rear candidate 3D object in an opposite direction to the moving direction in which the proximity touch is generated, as a distance between the generation position of the proximity touch and the first sensing space decreases, the controller reduces a number of the candidate 3D objects, and if the proximity touch generated on the second sensing space is moved and generated on the first sensing space, the controller detects coordinates of one 3D object corresponding to the proximity touch among the candidate 3D objects.

11. The apparatus of claim 10, wherein the controller selects, as the candidate 3D objects, the 3D objects which exist in a predetermined range around X, Y, and Z coordinates of the generation position of the proximity touch.

12. The apparatus of claim 10, wherein as the proximity touch generated on the second sensing space is moved and approaches the first sensing space, an accuracy of coordinates of the proximity touch is increased, such that the controller narrows a predetermined range for detecting the candidate 3D objects, thus reducing the number of candidate 3D objects.

13. The apparatus of claim 10, wherein if the candidate 3D objects are moved and displayed in the opposite direction to the moving direction in which the proximity touch is generated, the controller increases a transparency for the 3D object having a larger value than a Z value of X, Y, and Z coordinates of the proximity touch among the initially selected candidate 3D objects or does not display the 3D object.

14. The apparatus of claim 6, wherein to allow a user's hand or pen which generates the proximity touch to meet the one 3D object corresponding to the proximity touch among the candidate 3D objects on the first sensing space, the controller adjusts a movement amount of the candidate 3D objects by using the following equation:

$$Z'_u = \begin{cases} Z_u & Z > Z_2 \\ Z_u - \dfrac{Z_u - Z_0}{Z_2 - Z_0} & Z_0 < Z \le Z_2 \\ Z & Z \le Z_0 \end{cases}$$

where $Z_2$ indicates a maximum Z value of the second sensing space, $Z_1$ indicates a maximum Z value of the first sensing space, $Z_u$ indicates a position of the 3D object in case of absence of the proximity touch, Z indicates a position of the proximity touch generated by the user's hand or pen, $Z'_u$ indicates a position of the 3D object according to the generation position of the proximity touch, and $Z_0$ indicates a position in which the 3D object meets the user's hand or pen which generates the proximity touch on the first sensing space.

15. The apparatus of claim 1, wherein if the proximity touch is generated on a front stereoscopic space of the display unit, the controller moves and displays the at least one 3D object disposed on the stereoscopic space along the moving direction in which the proximity touch is generated, and if the proximity touch generated on the second sensing space is moved and generated as a contact touch on the display unit, the controller stops moving the at least one 3D object and detects coordinates of one 3D object corresponding to the contact touch among the at least one 3D object.

16. The apparatus of claim 15, wherein if the proximity touch is generated on a front stereoscopic space of the display unit, the controller detects a Z value of X, Y, and Z coordinates of the proximity touch to detect the moving direction of the proximity touch, and if a contact touch is generated on the display unit, the controller detects X, Y, and Z coordinates of the contact touch to detect coordinates of the one 3D object corresponding to the contact touch.

17. A method for sensing a three-dimensional (3D) object, the method comprising:

moving predetermined 3D objects in a predetermined direction, if a proximity touch is generated on a second sensing space in which a sensitivity with respect to the proximity touch is lower than a threshold value, on a stereoscopic space on which at least one 3D object is disposed;

detecting coordinates of the 3D object corresponding to the proximity touch generated on a first sensing space in which a sensitivity with respect to the proximity touch is higher than the threshold value, if the proximity touch generated on the second sensing space is moved and generated on the first sensing space; and performing a function corresponding to the 3D object, wherein, when the coordinates of the 3D object cannot be detected, the detecting of the coordinates comprises determining candidate 3D objects and detecting the 3D object among the candidate 3D objects according to a motion of the proximity touch.

18. The method of claim 17, wherein the stereoscopic space comprises a front stereoscopic space corresponding to a Z-axis direction of the display unit and a rear stereoscopic space corresponding to a −Z-axis direction of the display unit, and wherein the front stereoscopic space of the display unit comprises the first sensing space comprising a predetermined space in the Z-axis direction from the display unit on which at least one proximity sensors are disposed and the second sensing space comprising a predetermined space in the Z-axis direction from a maximum Z value of the first sensing space.

19. The method of claim 17, further comprising:

if the proximity touch is generated on the second sensing space, moving and displaying the at least one 3D object disposed on the stereoscopic space along a moving direction in which the proximity touch is generated, and if the proximity touch generated on the second sensing space is moved and generated on the first sensing space, stopping movement of the at least one 3D object and detecting coordinates of one 3D object corresponding to the proximity touch among the at least one 3D object.

20. The method of claim 19, further comprising:

if the proximity touch is generated on the second sensing space, detecting a Z value of X, Y, and Z coordinates of the proximity touch to detect a moving direction of the proximity touch, and if the proximity touch is generated on the first sensing space, detecting X, Y, and Z coordinates of the proximity touch to detect coordinates of the one 3D object corresponding to the proximity touch.

21. The method of claim 19, further comprising, to allow a user's hand or pen which generates the proximity touch to meet the one 3D object corresponding to the proximity touch among the at least one 3D object on the first sensing space, adjusting a movement amount of the at least one 3D object which are moved on the second sensing space by using the following equation:

$$Z'_u = \begin{matrix} Z_u & Z > Z_2 \\ Z_u - \dfrac{Z_u - Z_0}{Z_2 - Z_0} & Z_0 < Z \le Z_2 \\ Z & Z \le Z_0 \end{matrix}$$

where $Z_2$ indicates a maximum Z value of the second sensing space, $Z_1$ indicates a maximum Z value of the first sensing space, $Z_u$ indicates a position of the 3D object in case of absence of the proximity touch, Z indicates a position of the proximity touch generated by the user's hand or pen, $Z'_u$ indicates a position of the 3D object according to the generation position of the proximity touch, and $Z_0$ indicates a position in which the 3D object meets the user's hand or pen which generates the proximity touch on the first sensing space.

22. The method of claim 17, further comprising:
if a proximity touch is generated on the second sensing space, selecting the candidate 3D objects from among the at least one 3D object disposed on the stereoscopic space,
moving and displaying all the 3D objects along a moving direction in which the proximity touch is generated,
reducing a number of the candidate 3D objects as a distance between the generation position of the proximity touch and the first sensing space decreases, and
detecting coordinates of the one 3D object corresponding to the proximity touch among the candidate 3D objects if the proximity touch generated on the second sensing space is moved and generated on the first sensing space.

23. The method of claim 22, further comprising selecting, as the candidate 3D objects, the 3D objects which exist in a predetermined range around X, Y, and Z coordinates of the generation position of the proximity touch.

24. The method of claim 22, wherein as the proximity touch generated on the second sensing space is moved and approaches the first sensing space, an accuracy of coordinates of the proximity touch is increased, thus narrowing a predetermined range for detecting the candidate 3D objects and reducing and the number of candidate 3D objects.

25. The method of claim 22, further comprising, to allow a user's hand or pen which generates the proximity touch to meet the one 3D object corresponding to the proximity touch among the candidate 3D objects on the first sensing space, adjusting a movement amount of the candidate 3D objects by using the following equation:

$$Z'_u = \begin{matrix} Z_u & Z > Z_2 \\ Z_u - \dfrac{Z_u - Z_0}{Z_2 - Z_0} & Z_0 < Z \le Z_2 \\ Z & Z \le Z_0 \end{matrix}$$

where $Z_2$ indicates a maximum Z value of the second sensing space, $Z_1$ indicates a maximum Z value of the first sensing space, $Z_u$ indicates a position of the 3D object in case of absence of the proximity touch, Z indicates a position of the proximity touch generated by the user's hand or pen, $Z'_u$ indicates a position of the 3D object according to the generation position of the proximity touch, and $Z_0$ indicates a position in which the 3D object meets the user's hand or pen which generates the proximity touch on the first sensing space.

26. The method of claim 17, further comprising:
if the proximity touch is generated on the second sensing space, selecting the candidate 3D objects from among the at least one 3D object disposed on the stereoscopic space,
if the 3D object disposed on the rear stereoscopic space of the display unit exists among the selected candidate 3D objects, moving and displaying the candidate 3D object in an opposite direction to the moving direction in which the proximity touch is generated,
as a distance between the generation position of the proximity touch and the first sensing space decreases, reducing a number of the candidate 3D objects, and
if the proximity touch generated on the second sensing space is moved and generated on the first sensing space, detecting coordinates of one 3D object corresponding to the proximity touch among the candidate 3D objects.

27. The method of claim 26, further comprising selecting, as the candidate 3D objects, the 3D objects which exist in a predetermined range around X, Y, and Z coordinates of the generation position of the proximity touch.

28. The method of claim 26, wherein as the proximity touch generated on the second sensing space is moved and approaches the first sensing space, an accuracy of coordinates of the proximity touch is increased, thus narrowing a predetermined range for detecting the candidate 3D objects and reducing the number of candidate 3D objects.

29. The method of claim 26, further comprising:
determining whether the 3D object having a larger value than a Z value of X, Y, and Z coordinates of the proximity touch exists among initially selected candidate 3D objects, when the candidate 3D objects are moved and displayed in the opposite direction to the moving direction in which the proximity touch is generated; and
increasing a transparency for the 3D object having the larger value than the Z value of the X, Y, and Z coordinates of the proximity touch or not displaying the 3D object, if the initially selected candidate 3D objects include the 3D object.

30. The method of claim 26, further comprising, to allow a user's hand or pen which generates the proximity touch to meet the one 3D object corresponding to the proximity touch among the candidate 3D objects on the first sensing space, adjusting a movement amount of the candidate 3D objects by using the following equation:

$$Z'_u = \begin{matrix} Z_u & Z > Z_2 \\ Z_u - \dfrac{Z_u - Z_0}{Z_2 - Z_0} & Z_0 < Z \le Z_2 \\ Z & Z \le Z_0 \end{matrix}$$

where $Z_2$ indicates a maximum Z value of the second sensing space, $Z_1$ indicates a maximum Z value of the first sensing space, $Z_u$ indicates a position of the 3D object in case of absence of the proximity touch, Z indicates a position of the proximity touch generated by the user's hand or pen, $Z'_u$ indicates a position of the 3D object according to the generation position of the proximity touch, and $Z_O$ indicates a position in which the 3D object meets the user's hand or pen which generates the proximity touch on the first sensing space.

31. The method of claim 17, further comprising:
if the proximity touch is generated on a front stereoscopic space of the display unit, moving and displaying the at least one 3D object disposed on the stereoscopic space along the moving direction in which the proximity touch is generated, and
if the proximity touch generated on the second sensing space is moved and generated as a contact touch on the display unit, stopping movement of the at least one 3D object and detecting coordinates of one 3D object corresponding to the contact touch among the at least one 3D object.

32. The method of claim 31, further comprising:
if the proximity touch is generated on a front stereoscopic space of the display unit, detecting a Z value of X, Y, and Z coordinates of the proximity touch to detect the moving direction of the proximity touch, and
if a contact touch is generated on the display unit, detecting X, Y, and Z coordinates of the contact touch to detect coordinates of the one 3D object corresponding to the contact touch.

* * * * *